United States Patent
Sharp et al.

(10) Patent No.: US 11,528,304 B2
(45) Date of Patent: Dec. 13, 2022

(54) INTEGRATION OF VIDEO IN PRESENTATION CONTENT WITHIN AN ONLINE MEETING

(71) Applicant: Cisco Technology, Inc., San Jose, CA (US)

(72) Inventors: John Colin Sharp, London (GB); Hristina Stoyanova Palikareva, London (GB); Andrew Pepperell, Middlesex (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/117,580

(22) Filed: Dec. 10, 2020

(65) Prior Publication Data
US 2022/0191258 A1 Jun. 16, 2022

(51) Int. Cl.
*G06F 15/16* (2006.01)
*H04L 65/403* (2022.01)
*H04N 7/15* (2006.01)

(52) U.S. Cl.
CPC ............ *H04L 65/403* (2013.01); *H04N 7/15* (2013.01)

(58) Field of Classification Search
CPC .............................. H04L 65/403; H04N 7/15
USPC ....................................................... 709/204
See application file for complete search history.

(56) References Cited

U.S. PATENT DOCUMENTS

| | | | | |
|---|---|---|---|---|
| 2009/0033737 A1* | 2/2009 | Goose | ...................... | H04N 7/15 348/E7.083 |
| 2009/0199078 A1* | 8/2009 | Caspi | ..................... | H04N 7/152 715/202 |
| 2010/0318916 A1* | 12/2010 | Wilkins | .................. | G06Q 10/10 715/730 |
| 2011/0085018 A1* | 4/2011 | Culbertson | .............. | H04N 7/15 348/E7.083 |
| 2017/0006260 A1* | 1/2017 | Fogarty | ..................... | H04N 7/15 |
| 2017/0070704 A1 | 3/2017 | Li et al. | | |
| 2017/0199659 A1 | 7/2017 | Migos et al. | | |

(Continued)

OTHER PUBLICATIONS

Atomi Systems, Inc., "ActivePresenter 8 User Manual", Version 8.2, Last updated: Sep. 9, 2020, 405 pages.

(Continued)

*Primary Examiner* — Atta Khan
(74) *Attorney, Agent, or Firm* — Edell, Shapiro & Finnan, LLC

(57) ABSTRACT

An online meeting is established, via a meeting server, where the online meeting facilitates exchange of content between a plurality of separate meeting endpoints engaged in the online meeting. Video content is received at the meeting server from one or more of the meeting endpoints, and presentation content is received at the meeting server from a meeting endpoint associated with a presenter attendee that selects sharing of the presentation content within the online meeting. At the meeting server, an overlay window in the presentation content is identified, video content received at the meeting server from at least one meeting endpoint is inserted within the overlay window in the presentation content to form presentation content integrated with video content, and meeting endpoints engaged in the online meeting are provided for display the presentation content integrated with video content.

20 Claims, 15 Drawing Sheets

(56) References Cited

U.S. PATENT DOCUMENTS

2018/0322346 A1 11/2018 Davies et al.
2020/0126437 A1 4/2020 Fieldman

OTHER PUBLICATIONS

7 Max, "4K Photo Slide Show on the Wooden Desk, Intro Template", Oct. 18, 2016, 1 page; https://www.youtube.com/watch?v=fi4pV-Z9O0s.
Teaching Entrepreneurship, "How to Combine Your Slides and Webcam", Nov. 2, 2020, 3 pages; https://www.teachingentrepreneurship.org/engaging-online-lectures/.
Envato Market, "News Presenter in Broadcasting Studio With Green Screen", last updated Oct. 25, 2016, 4 pages; https://videohive.net/item/news-presenter-in-broadcasting-studio-with-green-screen/18426411.

* cited by examiner

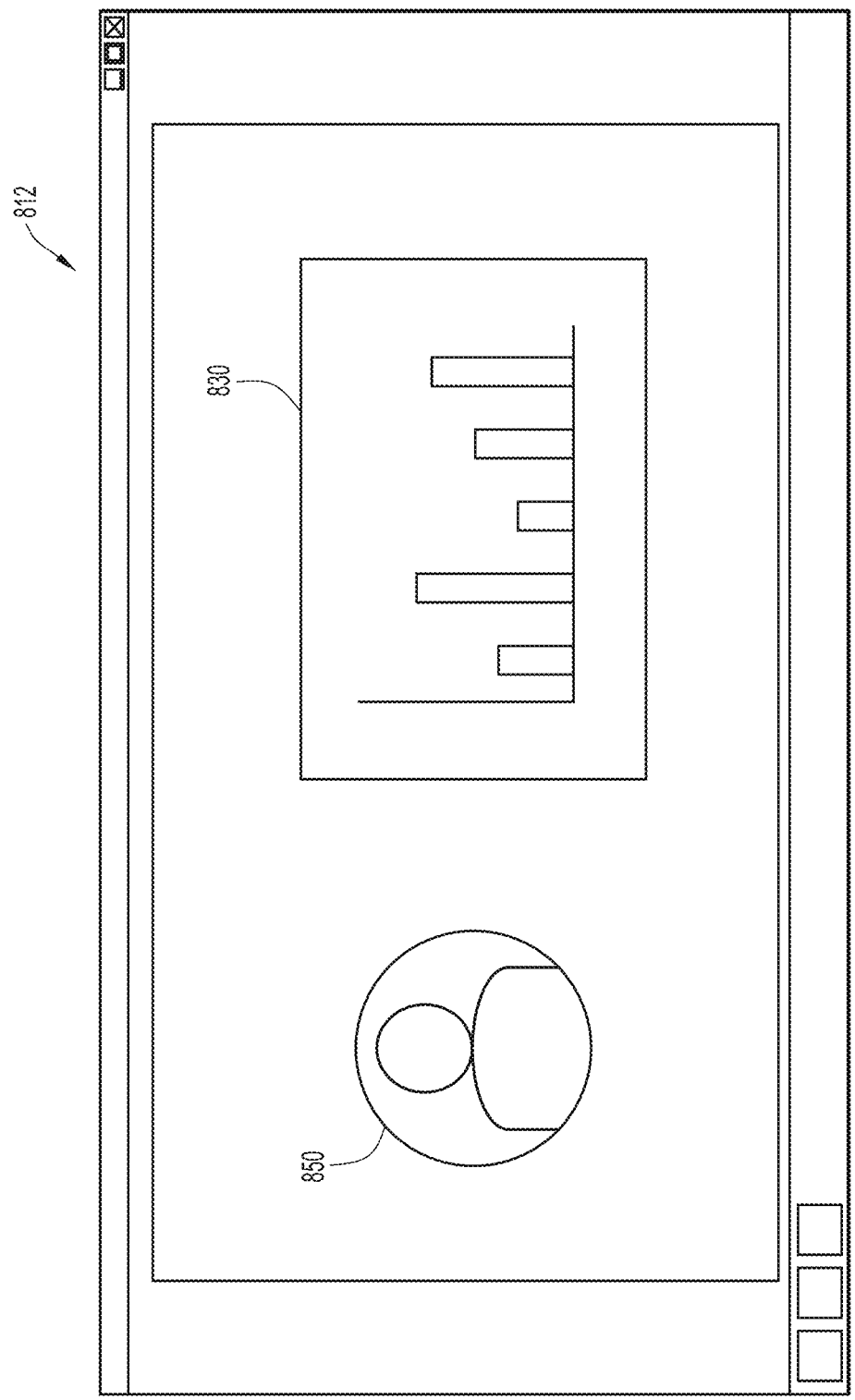

| | PRESENTATION CONTENT FOR SHARING | SHARED PRESENTATION CONTENT |
|---|---|---|
| SLIDE/PAGE 1 | 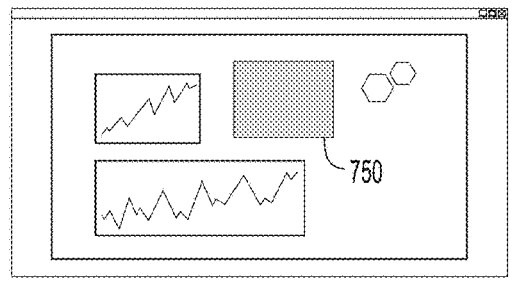 | 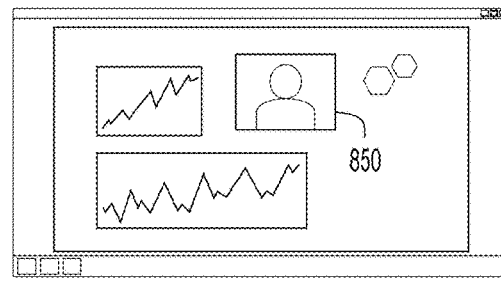 |
| SLIDE/PAGE 2 | 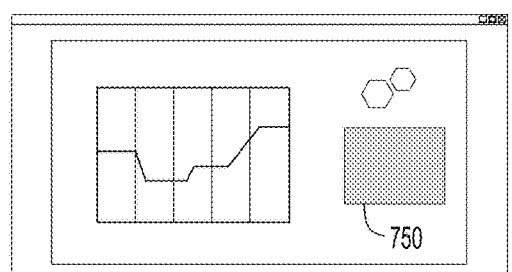 | 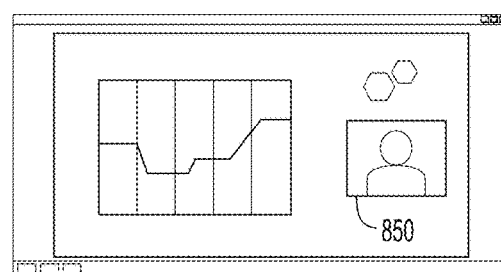 |
| SLIDE/PAGE 3 (NO OVERLAY WINDOW) | 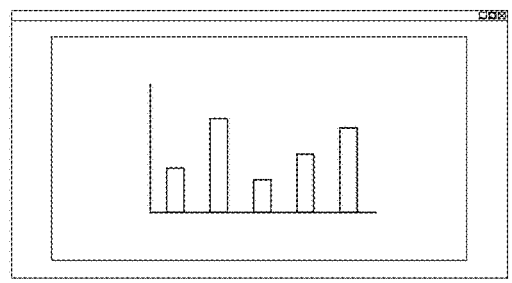 | 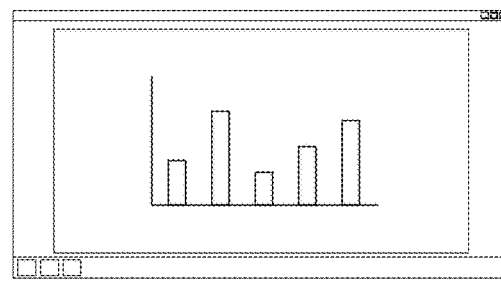 |
| SLIDE/PAGE 4 | 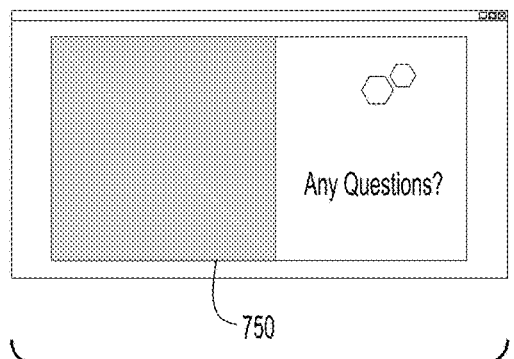 | 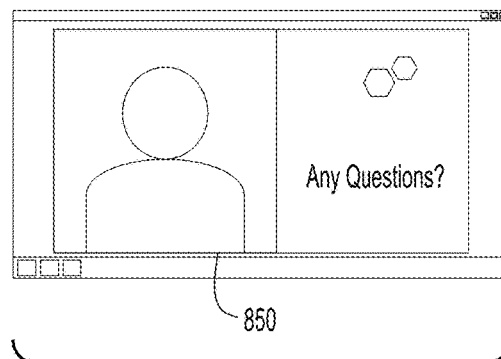 |
| | FIG.9A | FIG.9B |

(12)  US 11,528,304 B2

INTEGRATION OF VIDEO IN PRESENTATION CONTENT WITHIN AN ONLINE MEETING

TECHNICAL FIELD

The present disclosure relates to online meetings between attendees in which presentation content is shared by one or more attendees.

BACKGROUND

When presenting in a video conference, the material being presented (for instance a slide deck presentation or a word processing document) is often shown disjointed from the live video stream of the presenter. It can be hard to switch back to looking at the presenter to see any visual cues they give when presenting, and it can be distracting to have to keep switching focus, e.g., between one screen on which the presentation is being shown and another screen showing the live video of the conference participants. Providing a more seamless integration of a live video stream (e.g., of the presenter) suitably oriented and aligned with presentation content during an ongoing or real-time online meeting would render the meeting more beneficial.

BRIEF DESCRIPTION OF THE DRAWINGS

FIGS. 8A and 8B depict example embodiments of shared displays of documents during an online meeting of video content embedded or integrated within presentation content.

FIGS. 9A and 9B depict further example embodiments of displayed pages or slides of a slide deck document, where FIG. 9A depicts the view of the pages/slides of the document at a meeting endpoint as prepared by an attendee (showing an overlay window within the presentation content) while FIG. 9B depicts the view of the pages/slides of the document being shared within the online meeting and with video content embedded or integrated with presentation content.

FIG. 10A depicts the view of the page of the document at a meeting endpoint as prepared by an attendee (showing an overlay window within the presentation content/spreadsheet document) while FIG. 10B depicts the view of the page of the document being shared within the online meeting and with video content embedded or integrated with presentation content.

FIG. 11A depicts the desktop view at the computing device of the meeting endpoint as prepared/organized by an attendee (showing an overlay window within the desktop view) while FIG. 11B depicts the desktop view being shared within the online meeting and with video content embedded or integrated within the desktop view.

FIG. 12A depicts the view of the page of the document at a meeting endpoint as prepared by an attendee (showing two overlay windows within the presentation content) while FIG. 12B depicts the view of the page of the document being shared within the online meeting and with video content embedded or integrated at two locations within the presentation content.

DESCRIPTION OF EXAMPLE EMBODIMENTS

Overview

Figure 1:
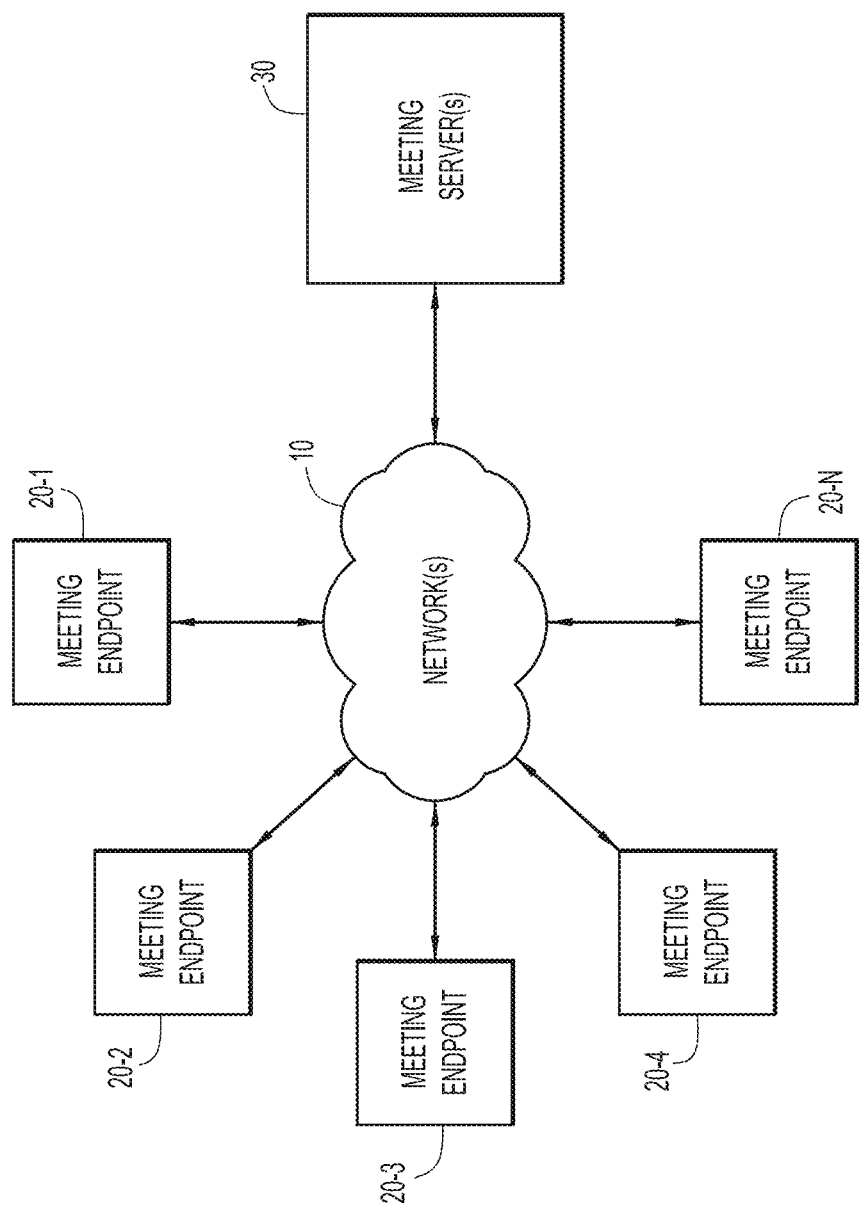
FIG. 1 is a schematic block diagram of an example system that supports an online meeting between participants/meeting endpoints, where the online meeting is hosted by one or more meeting servers.

In an embodiment, a method comprises establishing, via a meeting server, an online meeting that facilitates exchange of content between a plurality of separate meeting endpoints engaged in the online meeting, where each meeting endpoint is associated with at least one attendee of the online meeting. Video content is received at the meeting server from one or more of the meeting endpoints, and presentation content is received at the meeting server from a meeting endpoint associated with a presenter attendee that selects sharing of the presentation content within the online meeting. An overlay window in the presentation content is identified at the meeting server, and video content received at the meeting server from at least one meeting endpoint is inserted within the overlay window in the presentation content to form presentation content integrated with video content. The presentation content integrated with video content is provided for display to all the meeting endpoints engaged in the online meeting.

In another embodiment, an apparatus comprises a memory element configured to store instructions including one or more applications that support online meetings over a network, and a network processor unit configured to enable communications over a network. The apparatus further comprises a processor configured to execute and control operations of the one or more applications so as to: establish an online meeting that facilitates exchange of content between a plurality of separate meeting endpoints engaged in the online meeting, where each meeting endpoint is associated with at least one attendee of the online meeting, receive video content from one or more of the meeting endpoints, receive presentation content from a meeting endpoint associated with a presenter attendee that selects sharing of the presentation content within the online meeting, identify an overlay window in the presentation content, insert video content from at least one meeting endpoint within the overlay window in the presentation content to form presentation content integrated with video content, and provide for display to all the meeting endpoints engaged in the online meeting the presentation content integrated with video content.

In a further embodiment, one or more computer readable storage media are encoded with software comprising computer executable instructions and when the software is executed are operable to: establish an online meeting that facilitates exchange of content between a plurality of separate meeting endpoints engaged in the online meeting, where each meeting endpoint is associated with at least one attendee of the online meeting, receive video content at a meeting server from one or more of the meeting endpoints, receive presentation content at the meeting server from a meeting endpoint associated with a presenter attendee that selects sharing of the presentation content within the online meeting, identify at the meeting server an overlay window in the presentation content, insert video content received at the meeting server from at least one meeting endpoint within the overlay window in the presentation content to form presentation content integrated with video content, and provide for display to all the meeting endpoints engaged in the online meeting the presentation content integrated with video content.

Example Embodiments

In an online meeting, a group of attendees at client or meeting endpoints connect to an online meeting over one or more networks, where the online meeting is hosted and facilitated by one or more meeting servers. The attendees can share audio component and video component feeds (from the microphones and cameras of the computing devices of the attendees at their meeting endpoints), and the meeting server(s) provide an audio mix of the audio component feeds and the video components in a display layout for the online meeting. For example, the video components can comprise video images of one or more attendees (provided, e.g., in a multi-pane video layout) engaged in the online meeting. An attendee of the online meeting can choose to be a presenter of presentation content, where the attendee shares his or her displayed content or a portion of his or her displayed content (e.g., sharing of a document) at the computing device of the meeting endpoint associated with the presenter attendee. The presentation content can be displayed in the online meeting as a content streaming component that is separate from the layout of video components for the attendees. This can make it hard for attendees in the online meeting to simultaneously view both the presenter attendee with the presentation content.

As described herein, an online meeting facilitates engagement between a plurality of participants or attendees at meeting endpoints physically separated in distance from each other, where one or more meeting servers facilitate hosting in the online meeting by meeting endpoints for the exchange of audio content and/or video content during the meeting in real-time. In the online meeting, based upon attendee selection, presentation content can also be shared from an attendee's computing device at a meeting endpoint. The example embodiments described herein facilitate embedding or integration of video content (e.g., video streaming images of the attendee designated as presenter) within presentation content in an effective manner that does not block, obstruct or distract from the presentation content during the online meeting. The selection of location, size or dimension(s) and shape of an overlay window that includes the video content in the shared presentation content is controlled by the presenter attendee at the meeting endpoint side (i.e., the client side) of the online meeting, while the integration of the video content within the overlay window within the shared presentation content occurs at the meeting server side. By integrating video content, such as real-time video images of the presenter attendee, with the presentation content displayed in the online meeting, attendees can be provided with an enhanced experience in the meeting by being able to view the presenter attendee in close proximity with the presentation content being discussed by the presenter attendee.

As used herein, the term "real-time" refers to a very short time period (e.g., within one or more seconds or within one or more fractions of a second) in which any audio content, video content or presentation content associated with any meeting endpoint (e.g., presentation content provided by a host or current presenter within the online meeting) is transmitted, received, processed and/or output to all meeting endpoints engaged in an online meeting such that updated content (e.g., newly generated or revised/changed content) results in the updated content being displayed and accessible to all meeting endpoints within the online meeting at substantially the same time.

The meeting endpoints of participants can be any suitable computing device (e.g., a desktop computing device, a laptop, a tablet, etc.), and/or a meeting room associated with one or more computing devices that facilitate connection over a network with other meeting endpoints via one or more meeting servers that host the online meeting.

An example embodiment of an environment that facilitates engagement in an online meeting between participants via their meeting endpoints is depicted in FIG. 1. An apparatus or system comprises one or more meeting servers 30 that connect with a plurality of meeting endpoints 20-1, 20-2, 20-3, 20-4 . . . 20-N (where N can be any suitable number, such as two, three, tens, hundreds, etc.) over one or more networks 10.

The network(s) 10 facilitate communications and exchange of communications and content between the meeting endpoints 20 via the one or more host meeting servers 30. Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof. Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

The meeting server(s) 30 can provide a number of hosting services over the network(s) 10 to meeting endpoints 20 to facilitate a wide variety of exchanges of different types of content and communications as well as other information between participants at the meeting endpoints 20. For example, the meeting server(s) 30 can establish social networking environments for meeting endpoints that allow the meeting endpoints to engage in a variety of communications, such as email, instant messaging (IM), posting of blogs or other content and supporting of groups or communities of different participants or users within the platform. In addition, the meeting server(s) 30 support the features of online meetings as described herein, which includes the real-time or sharing of audio and video content as well as presentation content (e.g., desktop sharing of documents or other desktop displayed content originating from a meeting endpoint) between meeting endpoints 20 as described herein. Examples of shared audio content includes audio content generated by one or more participants at their meeting endpoints 20 (as captured, e.g., by a microphone associated with a computing device of a meeting endpoint). Examples of shared video content includes video streaming of one or more participants at their meeting endpoints 20 (as captured, e.g., by a camera associated with a computing device of a meeting endpoint).

Figure 2:
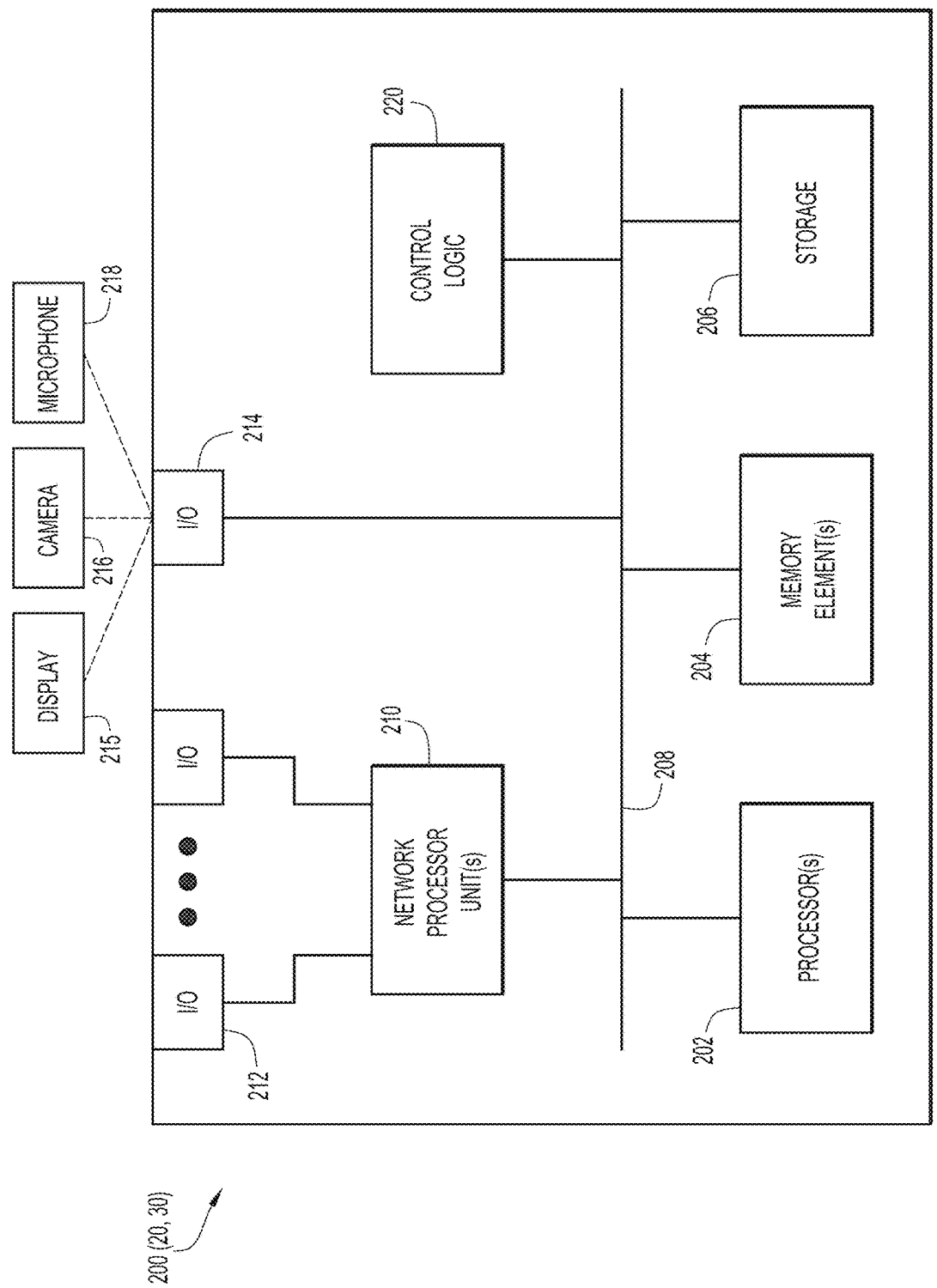
FIG. 2 is a schematic block diagram of a computing device that can be used by meeting endpoints and/or meeting servers within the example system of FIG. 1.

Each computing device of a meeting endpoint 20 and a meeting server 30 can have a general configuration as schematically depicted in the embodiment of FIG. 2 (where it is noted that some meeting endpoints and/or meeting servers can have some or all of the components depicted for the computing device of FIG. 2, while some can have further components for a particular embodiment that are not shown in FIG. 2). FIG. 2 illustrates a hardware block diagram of a computing device 200 that may perform functions associated with operations discussed herein in connection with the techniques described herein as well as depicted in further FIGS. 3-12. In various embodiments, a computing device, such as computing device 200 or any combination of computing devices 200, may be configured as any entity/entities as discussed for the techniques depicted in connection with the embodiments described herein in order to perform operations of the various techniques discussed herein.

In at least one embodiment, the computing device 200 (e.g., meeting endpoint 20 and/or meeting server 30) may include one or more processor(s) 202, one or more memory element(s) 204, storage 206, a bus 208, one or more network processor unit(s) 210 interconnected with one or more network input/output (I/O) interface(s) 212 (e.g., to facilitate communications and exchange of data between one or more meeting servers 30 and/or one or more other meeting endpoints 20), one or more I/O interface(s) 214, and control logic 220. In various embodiments, instructions associated with logic for computing device 200 can overlap in any manner and are not limited to the specific allocation of instructions and/or operations described herein.

The processor(s) 202 can be at least one hardware processor configured to execute various tasks, operations and/or functions for computing device 200 as described herein according to software and/or instructions configured for computing device 200. Processor(s) 202 (e.g., a hardware processor) can execute any type of instructions associated with data to achieve the operations detailed herein. In one example, processor(s) 202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

Memory element(s) 204 and/or storage 206 can be configured to store data, information, software, and/or instructions associated with computing device 200, and/or logic configured for memory element(s) 204 and/or storage 206. For example, any logic described herein (e.g., control logic 220) can, in various embodiments, be stored for computing device 200 using any combination of memory element(s) 204 and/or storage 206. Note that in some embodiments, storage 206 can be consolidated with memory element(s) 204 (or vice versa), or can overlap/exist in any other suitable manner. The memory element(s) 204 and/or storage 206 can store memory modules comprising one or more software applications that facilitate performance of instructions associated with online meeting operations in the manner as described herein. Application modules refer to a set of one or more software applications that provide the software tools used by computing devices of the meeting endpoints and/or the meeting server(s). The network platform comprises software applications and associated hardware (e.g., processors, input/output devices, etc.) that perform the various operations and functions associated with communications and exchange of information or content between meeting endpoints and meeting servers during online meeting sessions or other forms of communication/exchanges of content, based upon techniques described herein, where the software applications are located on computing devices of meeting endpoints 20, one or more meeting servers 30, as well as any other computing devices within the network(s) 10.

The bus 208 can be configured as an interface that enables one or more elements of computing device 200 to communicate in order to exchange information and/or data. Bus 208 can be implemented with any architecture designed for passing control, data and/or information between processors, memory elements/storage, peripheral devices, and/or any other hardware and/or software components that may be configured for computing device 200. In at least one embodiment, bus 208 may be implemented as a fast kernel-hosted interconnect, potentially using shared memory between processes (e.g., logic), which can enable efficient communication paths between the processes.

In various embodiments, network processor unit(s) 210 may enable communication between computing device 200 and other systems, entities, etc. (e.g., between meeting endpoints 20, between a meeting endpoint 20 and a meeting server 30, etc.), via network I/O interface(s) 212 and over a network 10 to facilitate operations discussed for various embodiments described herein. In various embodiments, network processor unit(s) 210 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 200 and other systems, entities, etc. to facilitate operations for various embodiments described herein. In various embodiments, network I/O interface(s) 212 can be configured as one or more Ethernet port(s), Fibre Channel ports, and/or any other I/O port(s) now known or hereafter developed. Thus, the network processor unit(s) 210 and/or network I/O interface(s) 212 may include suitable interfaces for receiving, transmitting, and/or otherwise communicating data and/or information in a network environment.

I/O interface(s) 214 allow for input and output of data and/or information with other entities that may be connected to computer device 200. For example, I/O interface(s) 214 may provide a connection to external devices such as a keyboard, keypad, a LCD screen LED screen, touch screen or any other suitable form of display screen for displaying content (e.g., display 215), one or more cameras (e.g., camera 216), one or more microphones (e.g., microphone 218) and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 220 can include instructions that, when executed, cause processor(s) 202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. The programs described herein (e.g., control logic 220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 204 and/or storage 206 can store data, software, code, instructions (e.g., processor instructions), logic, parameters, combinations thereof, and/or the like used for operations described herein. This includes memory element(s) 204 and/or storage 206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 3:
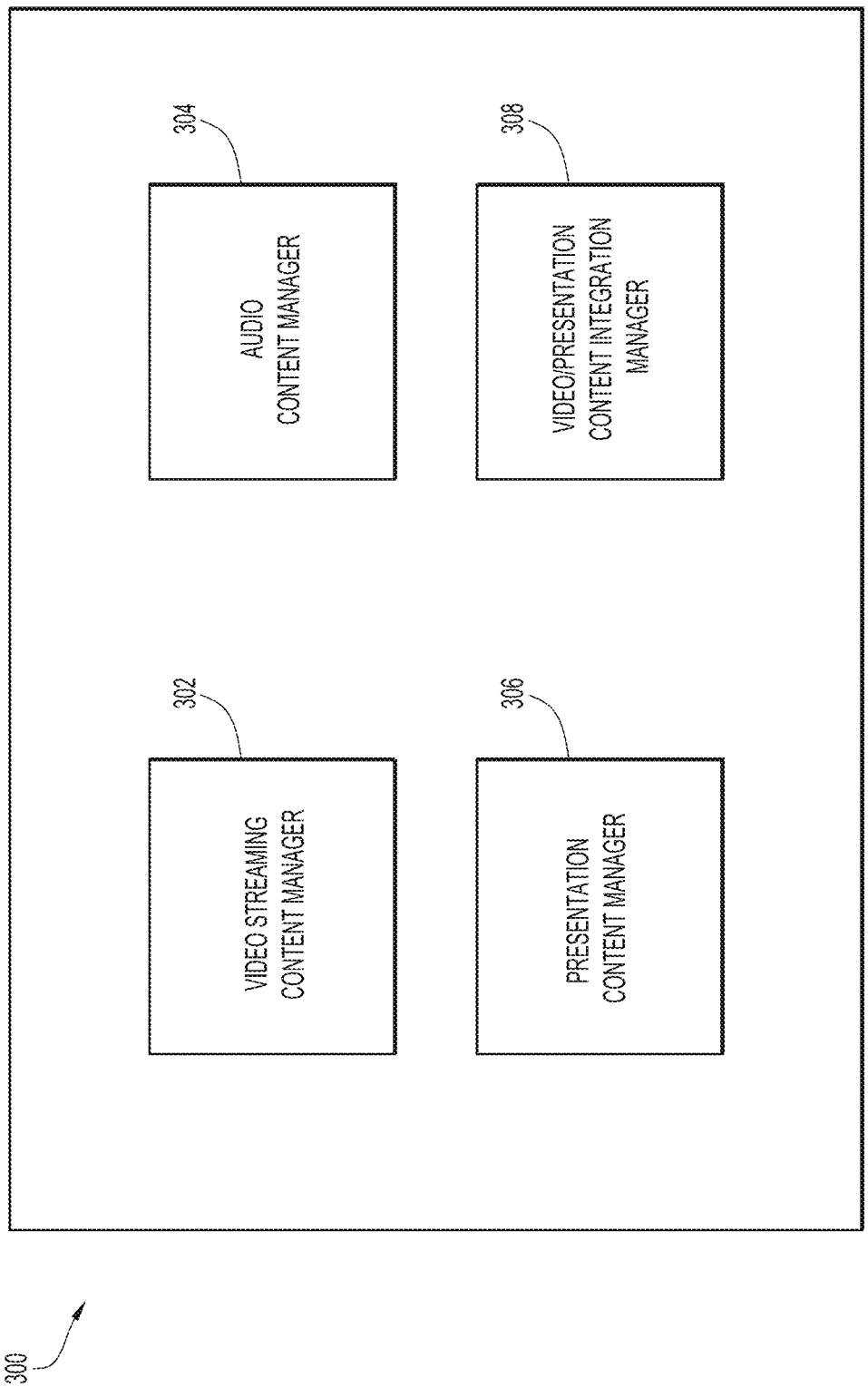
FIG. 3 is an example embodiment schematically depicting one or more software application modules used by a meeting server in association with hosting an online meeting within the system of FIG. 1.
Figure 4:
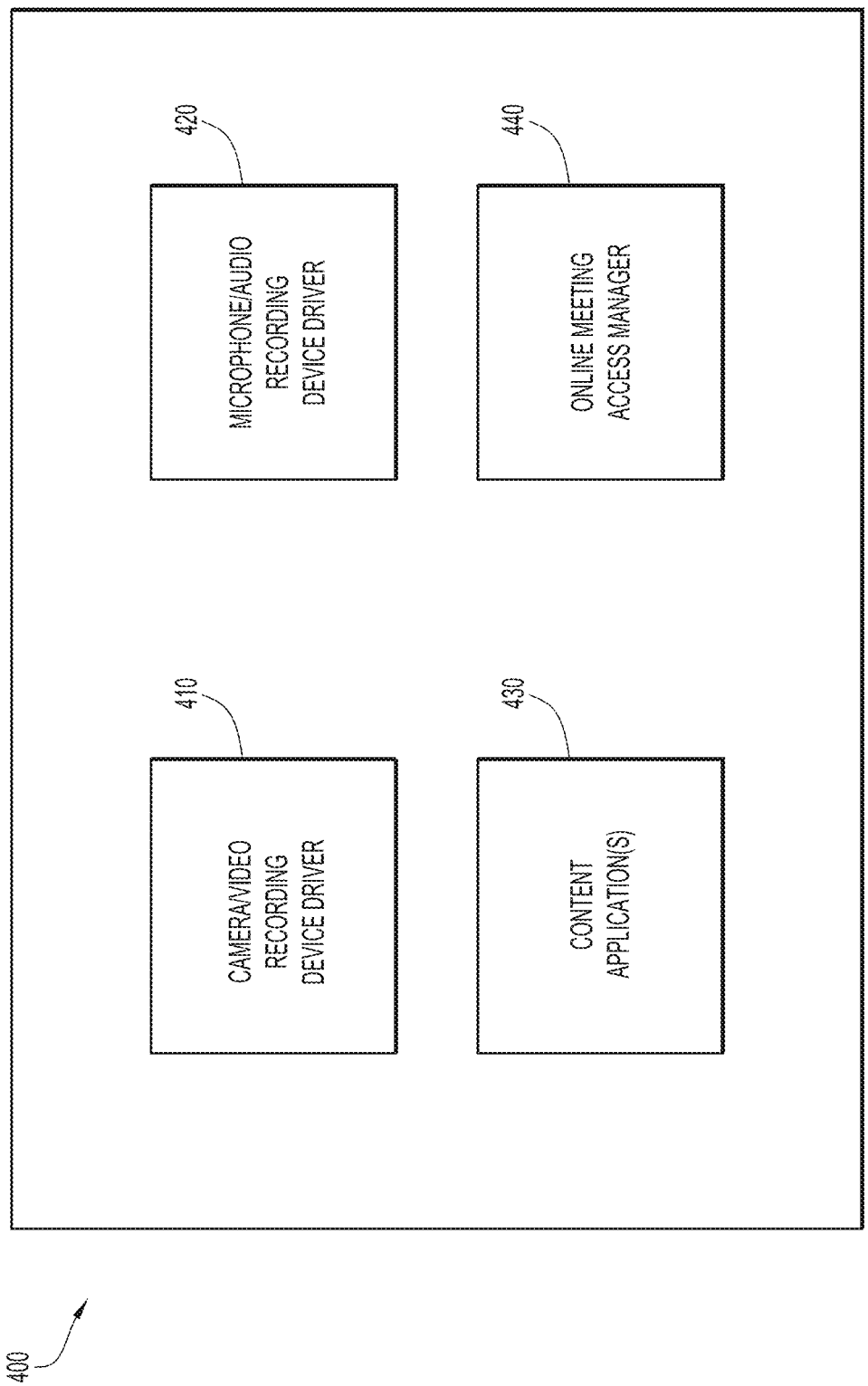
FIG. 4 is an example embodiment schematically depicting one or more software application modules used by a meeting endpoint in association with engaging in an online meeting within the system of FIG. 1.

Referring to FIG. 3, at least one meeting server 30 includes an application module 300 comprising one or more software applications for performing operations in relation to an online meeting hosted by the meeting server. The application module 300 is stored as memory elements 204 and/or in storage 206 of a computing device 200 for the meeting server. The application module 300 includes a video streaming content manager 302 that receives incoming video content streams in real-time from one or more meeting endpoints 20 associated with an online meeting, processes the incoming video content streams and provides the video content stream output in real-time to the meeting endpoints 20 of some or all the attendees of the ongoing meeting. An audio content manager 304 is also included in the module 300 to receive incoming audio content from one or more meeting endpoints in real-time from one or more meeting endpoints 20 associated with an online meeting, process the incoming audio content and provide the audio content output in real-time to the meeting endpoints 20 of some or all the attendees of the ongoing meeting. Similarly, a presentation content manager 306 is included in the module to receive incoming presentation content from one or more meeting endpoints in real-time from one or more meeting endpoints 20 associated with an online meeting, process the incoming presentation content and output the presentation content in real-time to the meeting endpoints 20 of some or all the attendees of the ongoing meeting.

Presentation content, as used herein, refers to any content that may be shared by an attendee's computing device 200 at a meeting endpoint 20, such as the sharing of any suitable type of document or running software application (e.g., a word processing document, a spreadsheet document, a slide deck presentation document, a PDF document, a JPEG, MPEG and/or any other type of picture of video format document, etc.) and/or the sharing of the desktop (i.e., the working area of the display screen, including displayed icons, opened applications, etc.) of the attendee's computing device 200 at the meeting endpoint 20.

The computing device 200 of each meeting endpoint 20 includes an application module 400 that includes a camera (or video recording device) driver 410 that communicates with a camera 216 connected with the computing device to capture video streaming content (e.g., video images of the attendee associated with the meeting endpoint). In addition, module 400 includes a microphone (or audio recording device) driver 420 connecting with the computing device to capture audio streaming content (e.g., audio content of a speaking attendee at the meeting endpoint). The module 400 also includes one or more content applications 430 (e.g., one or more word processing applications, spreadsheet applications, slide deck applications, PDF software applications, image or video processing and display applications, etc.). Further, the module 400 includes an online meeting access manager 440 that is operable to facilitate connection with and engagement in an online meeting, including exchange of audio and video streaming content and presentation content between the computing device of the meeting endpoint and other meeting endpoints as well as meeting server(s) engaged in the online meeting. In an example embodiment, the online meeting access manager 440 can comprise a meeting application that facilitates connection and engagement in the online meeting by the computing device of the meeting endpoint over a network 10 (e.g., a desktop and/or mobile meeting application that can be downloaded from a meeting server 30 to the computing device of a meeting endpoint 20 for use in engaging in online meetings via the meeting server). In another example embodiment in which a browser-based online meeting is enabled via the meeting server(s) 30, the online meeting access manager 440 can comprise a suitable web browser application that facilitates connection and engagement over the network 10 with other meeting endpoints 20 and/or meeting servers 30 over the network 10.

Referring again to FIG. 3, the application(s) module 300 of at least one meeting server 30 includes a video/presentation content integration manager 308 that provides operational instructions during an online meeting at the server side for embedding or integration of one or more video content streams received from one or more meeting endpoints engaged in the online meeting within presentation content also received from one or more meeting endpoints engaged in the online meeting. The presentation content embedded with the one or more video content streams is then output in real-time by the meeting server(s) 30 to the meeting endpoints 20 engaged in the online meeting.

Figure 5:
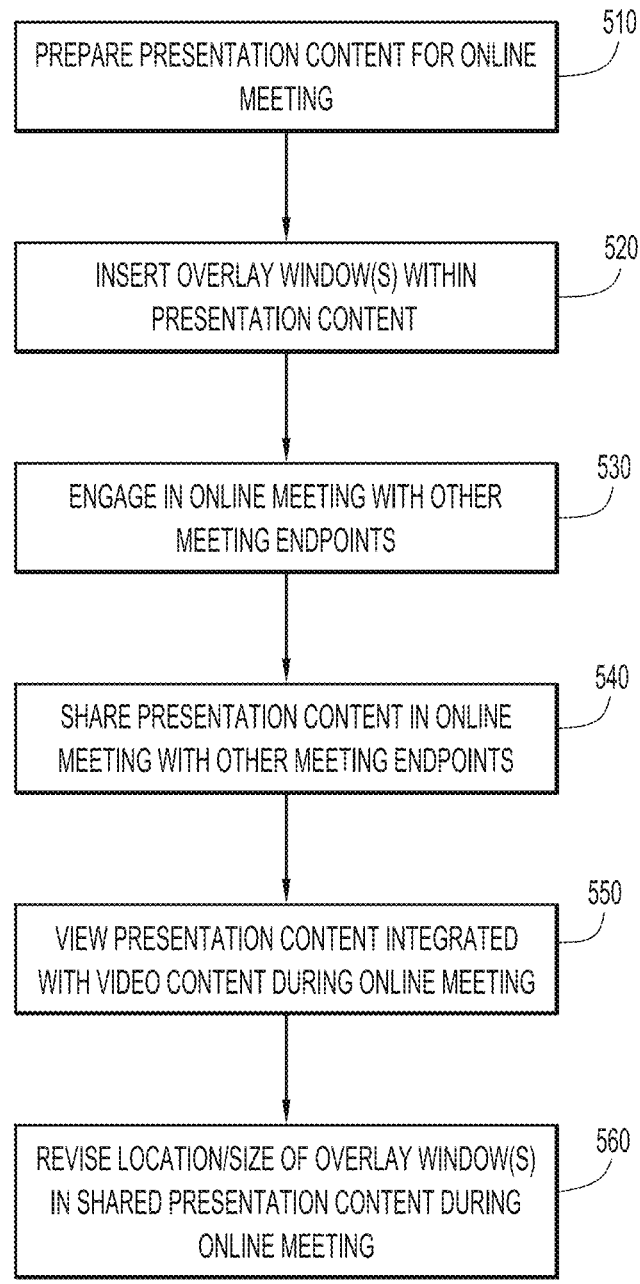
FIG. 5 is a flowchart depicting an example process at an attendee/meeting endpoint side for preparing presentation content for an online meeting that includes one or more overlay windows selectively provided by the attendee within the presentation content.
Figure 6:
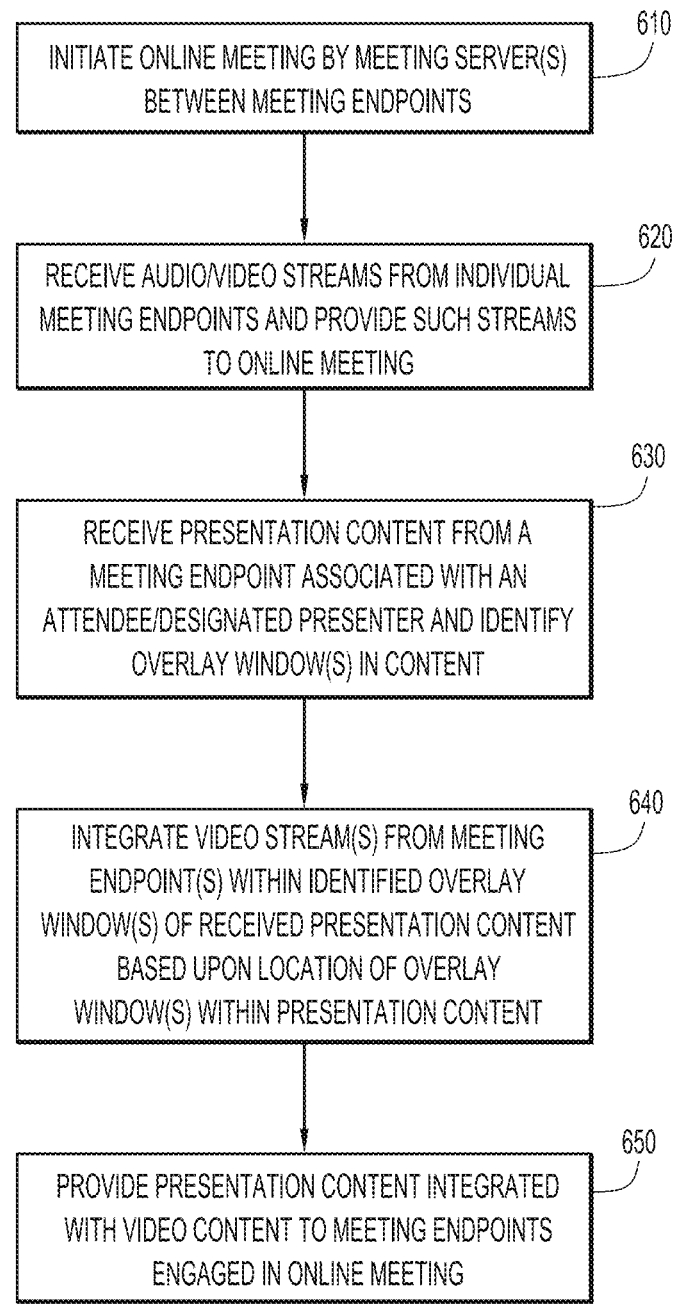
FIG. 6 is a flowchart depicting an example process at a meeting server side for integrating or embedding video content within presentation content to be shared by an attendee in an online meeting.

Operations associated with an online meeting and the integration or embedding of video streaming content within presentation content for the online meeting is described in relation to the flowcharts of FIGS. 5 and 6 and the views of displayed presentation content as shown in FIGS. 7-9. Operations that occur at a meeting endpoint 20 (i.e., operations at the attendee/meeting endpoint side or client side) are described in relation to the flowchart of FIG. 5. Operations that occur by the one or more meeting servers 30 (i.e., operations on the server side) that initiate and host an online meeting between attendees via the meeting endpoints 20 associated with the attendees are described in relation to the flowchart of FIG. 6.

Referring initially to FIG. 5, at 510, which may be prior to (or during engagement in) an online meeting, a participant or attendee associated with a meeting endpoint generates presentation content to be shared with attendees during the online meeting. The presentation content can be generated at any computing device, such as a computing device of a meeting endpoint or some other computing device not associated with the meeting endpoint (but which makes available the presentation content to the meeting endpoint prior to or during engagement of the meeting endpoint in the online meeting). At some point during the online meeting, the attendee may be identified as a designated presenter or presenter attendee and will present or share the generated presentation content with other attendees, e.g., by selecting a "share content" feature within the online meeting, in which the presenter attendee shares a display of a document and/or a desktop view displayed by the computing device 200 of the meeting endpoint 20 associated with the presenter attendee.

At 520, the attendee inserts any one or more overlay windows within the presentation content. For example, an overlay window can be inserted within a document, such as a slide deck document (e.g., a Microsoft® POWERPOINT or PPT document), a word processing document (e.g., a Microsoft® WORD document), a spreadsheet document (e.g., a Microsoft® EXCEL document), a PDF document, or any other suitable document (e.g., a JPEG, an MPEG, etc.). The overlay window can also be inserted in the desktop view of the computing device for the attendee (e.g., in a scenario in which the attendee's desktop view will be shared in the online meeting). The overlay window can be an inserted shape (e.g., a rectangular shape, a circular or oval shape, an irregular shape, etc.) defined by a suitable boundary that is created and inserted within the document at a suitable location as well as a suitable size. In other words, the participant selects a specific location, shape and size of the overlay window within the document. The boundary of the overlay window can comprise any one or more suitable boundary lines that define the dimensions of the overlay window for purposes of identifying the size of the video content to be inserted within presentation content. Alternatively, the boundary of the overlay window can comprise any suitable encoded information that identifies the dimensions of the video content to be inserted in the presentation content at the location of the overlay window (where the video content dimension(s) can be less than or greater than the size of the overlay window).

The preparation of the presentation content and overlay window(s) within the presentation content can be prepared by an attendee (or other person) at a computing device of the meeting endpoint. It is further noted that the method of insertion of the overlay window is client agnostic in that the overlay window is not limited to being inserted via a computing device at a meeting endpoint but instead can be inserted at any computing device in which a software application facilitates insertion of such a window by an attendee/meeting presenter within presentation content to be shared during the online meeting. For example, as previously noted, an attendee (or other person) can prepare presentation content (e.g., a slide deck presentation) at step 510, and then insert one or more overlay windows within the presentation content, at step 520), via a software application on a computing device that is not associated with the meeting endpoint (i.e., such computing device will not engage in the online meeting). Another computing device at the meeting endpoint can then obtain access to such presentation content (with one or more overlay windows) for purposes of sharing the presentation content during the online meeting.

Figure 7A:
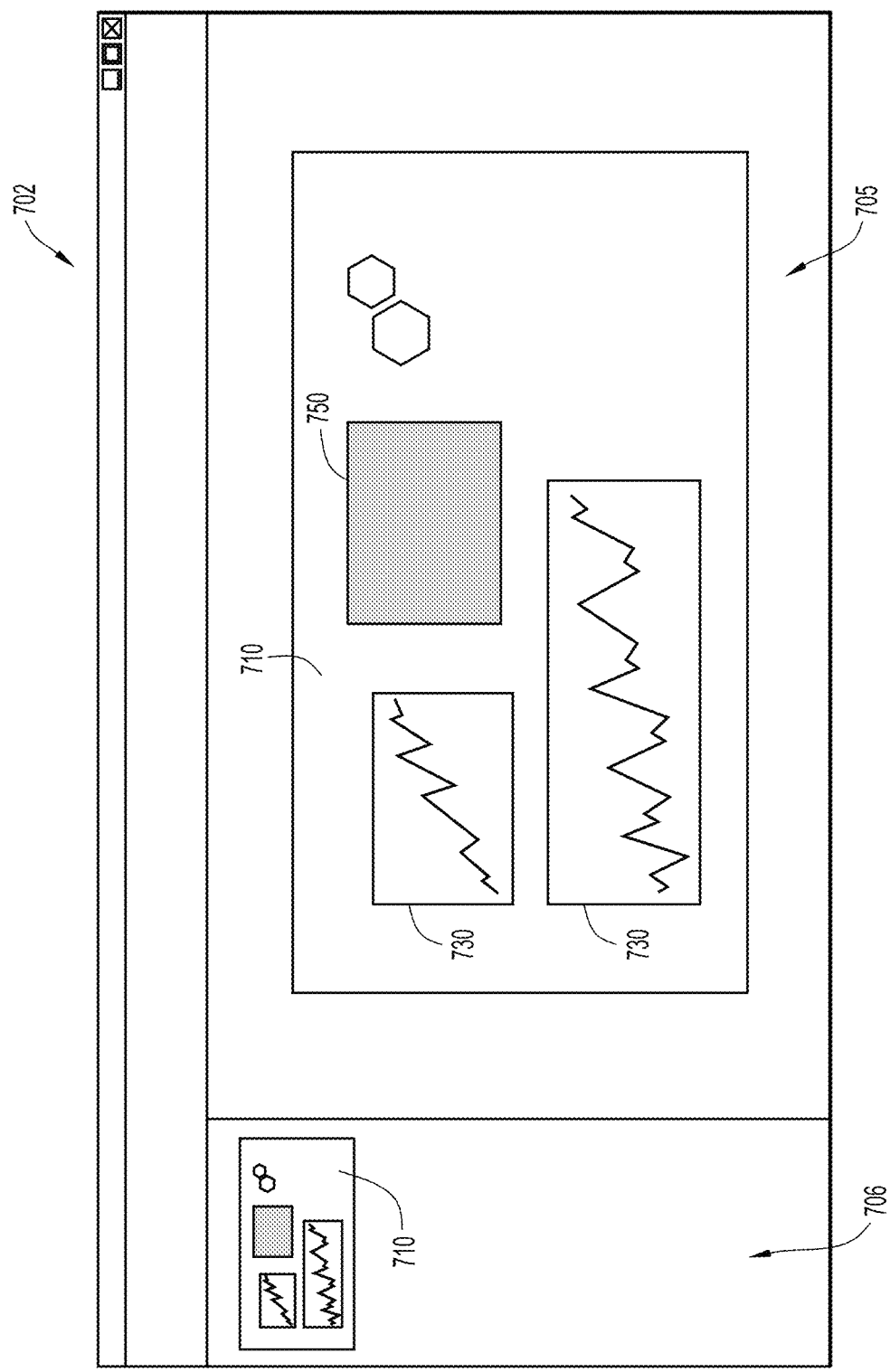
FIGS. 7A and 7B depict example embodiments of a slide deck document prepared at a computing device (e.g., by an attendee at a computing device of a meeting endpoint side or at a computing device separate from the meeting endpoint side), where pages or slides of the document include overlay windows.
Figure 7B:
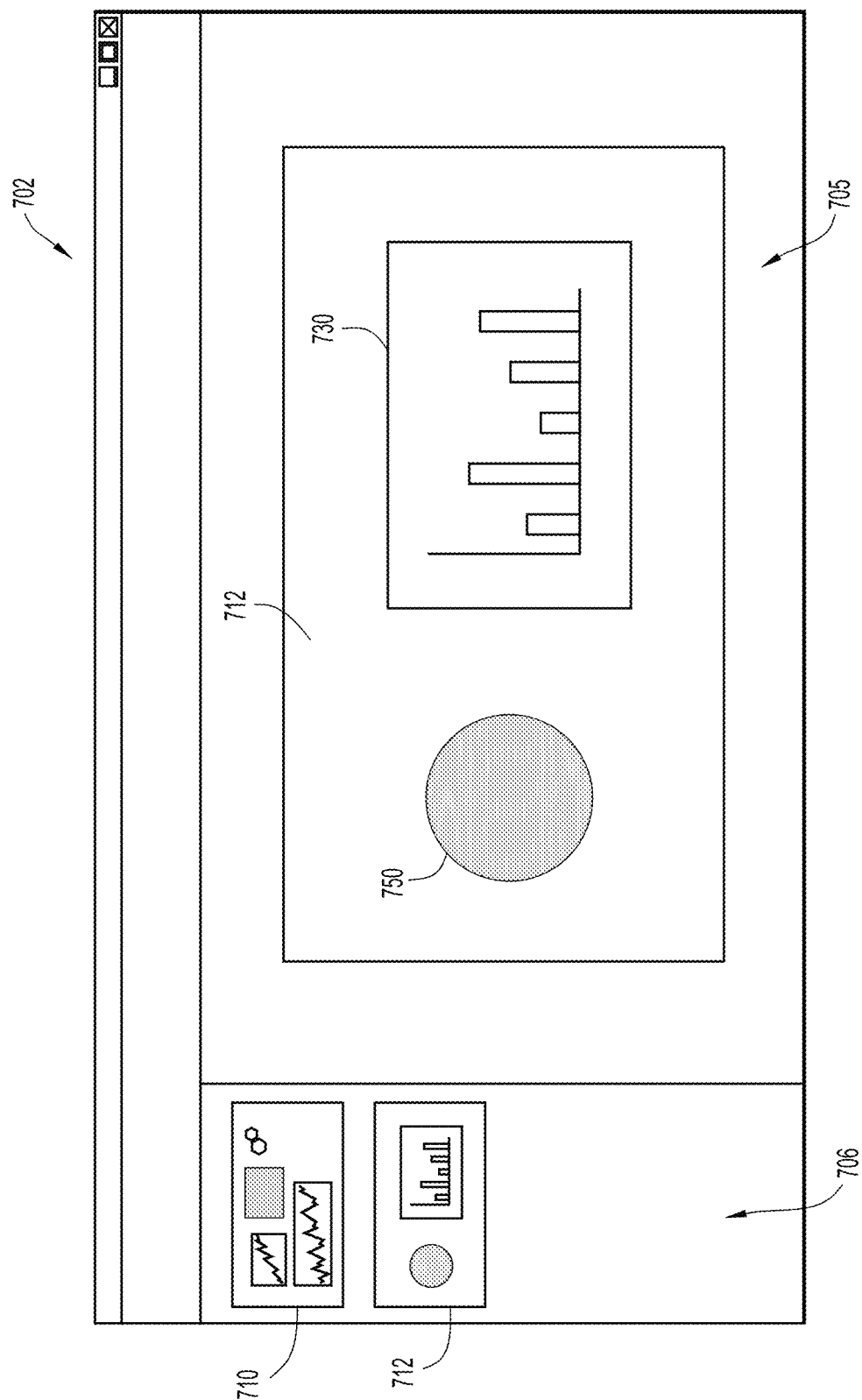

Referring to FIGS. 7A and 7B, an example embodiment is depicted showing pages or slides of a slide deck document that is prepared by an attendee as presentation content for an online meeting. In FIG. 7A, a page or slide 710 of a slide deck document 702 is prepared and includes presentation content 730 (e.g., graphs, charts or other data to be presented). The document 702 displays an enlarged page view area 705 showing a single slide 710 that can be generated and revised in any manner to add, alter and/or remove content based upon user preference. The document 702 further includes a tile area 706 showing all slides for the document as tiles or smaller depicted versions of the slide. A single slide 710 has been generated in tile area 706 for the document 702 as depicted in FIG. 7A, while two slides 710, 712 are generated and appear in tile area 706 for the document 702 as depicted in FIG. 7B. Utilizing the document software, the attendee generates an icon or overlay window 750 (step 520) within the slide 710 of the document 702 and places the overlay window 750 at a suitable location within the slide 710. In slide 710, the overlay window 750 has a rectangular shape or boundary defined by four boundary lines and is suitably located and suitably sized by the attendee so as to not interfere, obstruct or overlap with the presentation content 730 within the slide. Utilizing the document software, the overlay window 750 can further be filled with an identifier or indicator, such as an indicator color selected by the attendee (e.g., the color green). As described herein, such indicator color can be used to identify the overlay window 750 at the meeting server side to designate where video content is to be inserted or embedded/integrated within presentation content. As further noted herein, another type of identifier or indicator other than color (e.g., a specific object, symbol or other icon) can also be provided within the overlay window by the attendee, where such other type of indicator is used for identification purposes on the server side to determine the location for insertion/integration of video content within the presentation content. Further, as previously noted, the overlay window 750 with indicator can define both location and dimensional size (e.g., based upon the boundary lines defining the overlay window) of the video content to be inserted or integrated within the presentation content. Alternatively, the indicator within the overlay window 750 (or other embedded content associated with the overlay window) can define the dimensions of the video content to be integrated with the presentation content independent of the size/dimensions of the overlay window or dependent on the overlay window size but not the same dimensions (e.g., larger or smaller than) as the dimensions of the overlay window.

Referring to FIG. 7B, another slide 712 for document 702 is prepared by the attendee including content 730 and an overlay window 750 provided at a suitable location and suitable size so as to not obstruct or overlap the content 730 that attendee desired to be viewed during the presentation of the online meeting. In slide 712, the overlay window 750 has a rounded or circular shape defined by a rounded boundary line as selected by the user and further includes an identifier (e.g., filled in with a color such as green) within the overlay window 750 that provides identification on the server side during embedding or integration of video content within the overlay window for display during the online meeting. The attendee can continue to generate presentation content, adding as many slides or pages to a particular document with one or more overlay windows inserted as suitable locations within pages of the document as desired.

Referring to FIG. 6, at 610 an online meeting is initiated and hosted by at least one meeting server 30 so as to connect meeting endpoints 20 associated with attendees and over network(s) 10 for the exchange of audio, video and/or presentation content during the online meeting.

At 530, the attendee engages in an online meeting via a computing device 200 at the meeting endpoint 20 associated with the attendee (e.g., via a desktop, laptop or other mobile or specialized computing device of the attendee). The online meeting is also engaged in by other attendees, via computing devices at their respective meeting endpoints. During engagement of the online meeting, each attendee can provide audio and video content (generated by the camera 216 and microphone 218 of each attendee at a computing device 200 associated with the respective meeting endpoint 20 of the attendee) to one or more meeting servers 30 associated with the online meeting.

During the online meeting, at 620, a meeting server 30 receives streaming audio and video content that is captured by camera and microphone devices at the computing devices/meeting endpoints of the attendees that are engaged/connected in the online meeting and provides such audio and video content to all meeting endpoints 20 engaged in the online meeting. For example, mixed audio content, including all the audio content feeds from all meeting endpoints 20 can be output by the meeting server 30 to the online meeting. A multi-pane view can display video content associated with some or all of the meeting endpoints as a separate and distinct video pane for each meeting endpoint. At 630, and upon designation by an attendee as a presenter in the online meeting (in which the attendee selects to share content with other attendees in the online meeting, at 540), the meeting server 30 receives presentation content comprising a display of the presentation document (or other presentation content/other desktop view at the presenter attendee's computing device that is intended for sharing) from the designated presenter and further identifies any overlay window(s) within such presentation content.

Based upon the example of FIGS. 7A and 7B, the meeting server 30 receives the presentation content comprising a streaming video display of the document 702 as presented at the display 215 of the computing device 200, which includes a selective display by the attendee of slide such as slides 710 and 712 for document 702. For example, as the attendee/designated presenter is sharing presentation content in the form of document 702, the attendee/designated presenter may switch between slides 710 and 712 (as well as other slides in document 702) for sharing in the online meeting. The meeting server 30 receives this presentation content and identifies any overlay window 750 that may be located within each of the slides of the document as each slide is selected for sharing/display in the online meeting. For example, when slide 710 is displayed by the presenter attendee within the online meeting (e.g., the presenter attendee has elected to share document 702 and is currently displaying slide 710), the overlay window 750 in slide 710 of the document 702 is identified by the meeting server, including the shape (rectangular) and size or dimensions of the overlay window 750 in relation to the dimensions of the slide 710 as well as the exact spatial location of the overlay window 750 within the slide 710. Similarly, when slide 712 is shared and displayed by the presenter attendee in the online meeting (e.g., the presenter attendee scrolls or advances from slide 710 to slide 712), the shape (circular), size or dimensions and spatial location of the overlay window 750 within the slide 712 is identified by the meeting server 30.

Identification by the meeting server of the overlay window within the presentation content can be achieved in a number of ways. As previously noted herein, an overlay window can be defined based upon a boundary line or boundary lines defining the periphery of the overlay window, where an overlay indicator is then provided within the interior of the overlay window. The size and shape of the overlay window can be determined by the meeting server based upon the boundary line or lines that define the periphery of the overlay window and in which the overlay indicator is located.

The indicator provided within the overlay window can be a color (e.g., green, black, red, etc.) that fills some or all of the interior of the overlay window. When the attendee creates and inserts an overlay window within presentation content (step 520), the shape, size and placement location within the presentation content can be completely controlled by the attendee. In an example embodiment, a specific color designated as the indicator can be required by the meeting server(s) hosting the online meeting (e.g., a specific color, such as green, must be used).

In another example embodiment, the indicator color can be chosen by the attendee from a selected number of optional colors (e.g., green, black, red, etc.) for filling the interior of an overlay window that is created within presentation content, and the specific color selected as the indicator (e.g., green, black, red, etc.) can then be conveyed to the meeting server at the time the attendee selects sharing of presentation content within the online meeting. For example, an interactive tool within a browser or graphical user interface of the online meeting can include a selection mechanism, such as a pull-down menu for selection of options, that is associated with the selection of sharing content by an attendee within the online meeting. The interactive tool can provide an option for the presenter attendee to select a specific color (e.g., green) out of a choice of colors, where the selected color matches the color filled within some or all of each overlay window of the presentation content.

In another example embodiment, the indicator for an overlay window can be a symbol (e.g., one or a series/string of alphanumeric digits/text, or some other identifiable icon) placed within the interior of the overlay window that is recognizable by the meeting server as the indicator for the overlay window. The indicator symbol can either be specifically required by the meeting server, or the indicator symbol can be provided by the presenter attendee to the meeting server via a suitable interactive tool within the online meeting (where the presenter attendee provides the meeting server with a symbol comprising a specific string of text or one or more specific icons that will identify the overlay window when such symbol is provided within the overlay window).

At 640, the meeting server 30 inserts or integrates a video stream from at least one attendee within the overlay window(s) in the presentation content as identified by the meeting server 30 so as to form presentation content integrated with video content. For example, the video content associated with the presenter attendee (in the form of the video stream captured by the camera of the presenter attendee's computing device, which displays captured images of the presenter attendee) can be embedded or integrated within the slide 710 at the location of the overlay window 750. The video content is further sized by the meeting server 30 in any suitable manner. For example, the video content can be sized or dimensioned so as to match the size and shape of the overlay window 750, and thus completely or entirely fill the area defined by the overlay window 750 (based upon the defined one or more boundary lines of the overlay window). Alternatively, as previously noted herein, the video content can be dimensioned based upon an icon or other embedded content associated with the overlay window 750, such that the video content may be larger or smaller in size in relation to the overlay window. In another example embodiment, when an overlay window is identified by a meeting server in presentation content, the video content can be cropped so as to suitably fit within the area defined by the presentation window while maintaining the focal point or focal location of the video content. For example, when the video content comprises video images of an attendee, the meeting server can identify the focal point of the video content so as to include the attendee's face (e.g., using facial and/or body recognition software, which can comprise part of the video/presentation content integration manager 308 of the module 300 for the meeting server 30).

Figure 8A:
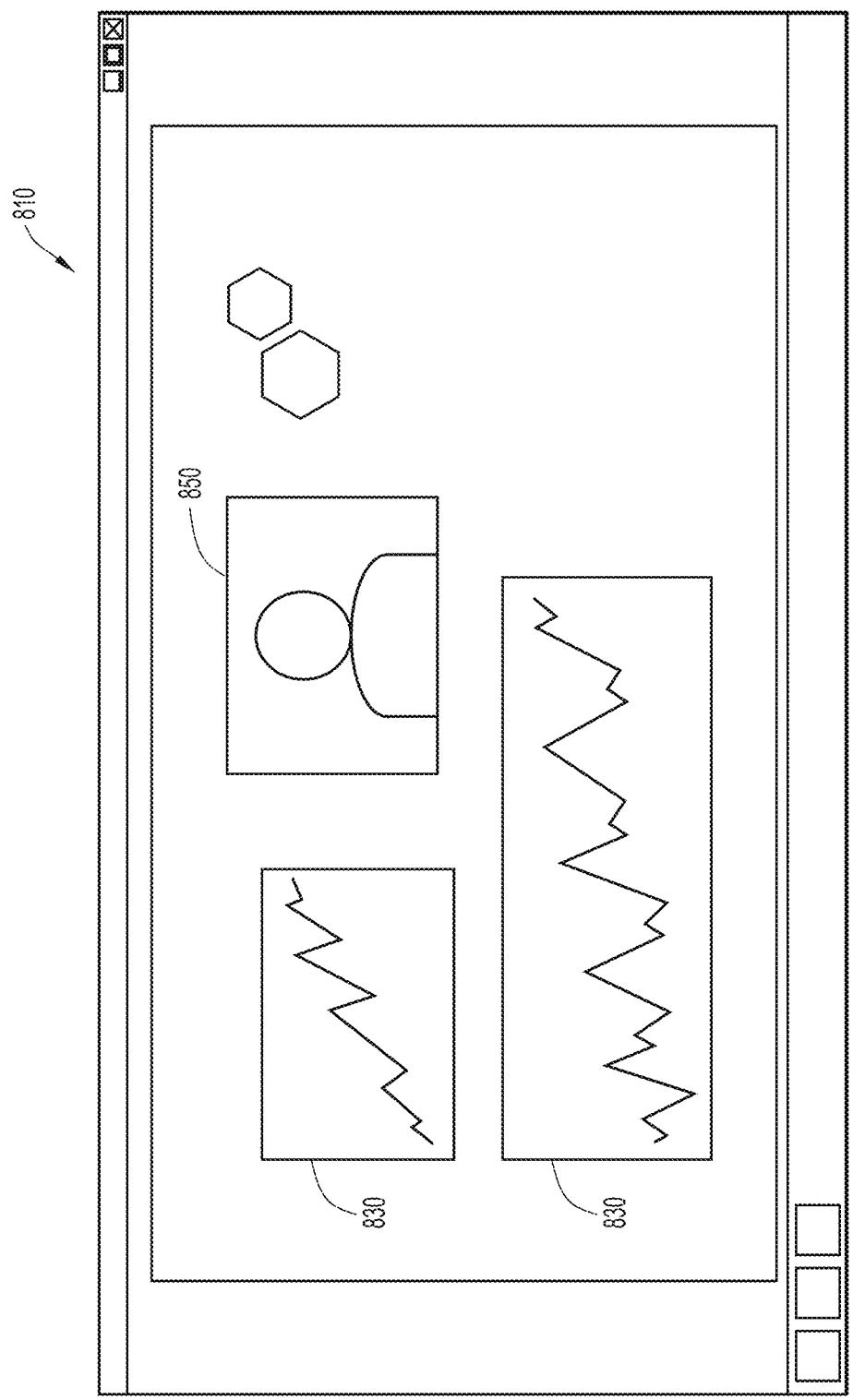

At 650, the presentation content integrated or embedded with video stream content is provided as shared content by the meeting server 30 to the meeting endpoints 20 engaged in the online meeting for display at the computing devices 200 of the meeting endpoints. Referring to FIG. 8A, the shared presentation content can comprise shared slide 810 (i.e., when the presenter attendee is displaying slide 710 at the display 215 of computing device 200 associated with the presenter attendee), which includes presentation content 830 that corresponds with the presentation content 730 of slide 710 displayed at the presenter attendee's computing device. Embedded within the shared slide 810 is the rectangular overlay window 850 (also referred to herein as a presentation window) that includes a video content stream provided by the meeting endpoint 20 of the presenter attendee (i.e., streaming video content of the presenter attendee in real-time), where the overlay or presentation window 850 in the shared slide 810 corresponds in shape, size/dimensions and spatial location of the overlay window 750 within slide 710 and the video content fills the entire area defined by presentation window 850. When the presenter attendee scrolls or advances from slide 710 to slide 712 (FIG. 7B) in the document 702, the displayed content within the online meeting by the meeting server 30 is depicted in FIG. 8B as the shared slide 812. The shared slide 812 includes a circular overlay window 850 that corresponds, in size/dimensions, shape and spatial location in relation to presentation content 830 within the slide 812 with circular overlay window 750 of slide 712). The video content fills the entire area defined by the boundary line of the circular overlay window 850.

At 550 (at the attendee/meeting endpoint side or the client side), the shared presentation content is viewed by the presenter attendee as well as other attendees, such that the shared presentation content integrated or embedded with video content is shared for viewing by all attendees at all meeting endpoints 20 engaged in the online meeting.

Thus, the overlay window for integrating video content with shared presentation content in an online meeting can be completely controlled by the presenter attendee in relation to location, size and shape of the video content, where the overlay window location, size and/or shape can further be changed and controlled by the presenter attendee based upon where the overlay window is placed within different pages or slides of a document to be shared. Referring to FIGS. 9A and 9B, a series of slides or pages are depicted (e.g., slide/page 1, slide/page 2, slide/page 3, and slide/page 4) in which the location and size of the overlay window within a slide/page can change (based upon the content to be viewed within a particular slide/page). It is noted that FIG. 9A refers to a series of slides/pages displayed at the computing device of a presenter attendee (e.g., prior to sharing), where some of the slide/pages include overlay windows 750 at varying locations and having varying sizes. The same corresponding slides/pages that are shared during an online meeting are depicted in FIG. 9B, but where the presentation windows 850 integrate or embed video content. In addition, one or more slides/pages (e.g., slide/page 3) may not include any overlay window. In such a case, no overlay window will be identified by the meeting server during sharing of this slide/page during the online meeting, and consequently no video content will be integrated or embedded within this slide/page.

Figure 9D:
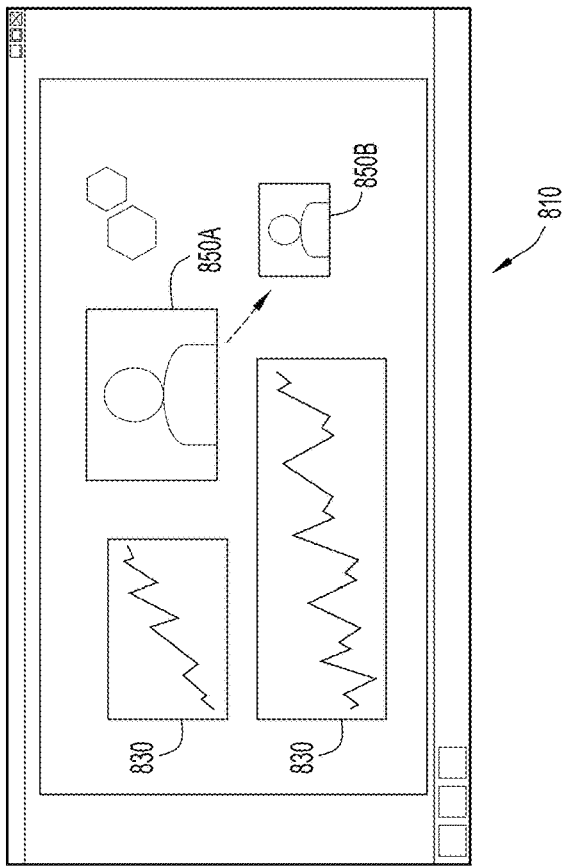
FIGS. 9C and 9D depict example embodiments of slide/page 1 from FIGS. 9A and 9B, respectively, and in which the overlay window in FIG. 9C is moved and resized by a presenter attendee, where the corresponding movement and resizing of the displayed video content integrated with displayed presentation content occurs in real-time during the online meeting.
Figure 9C:
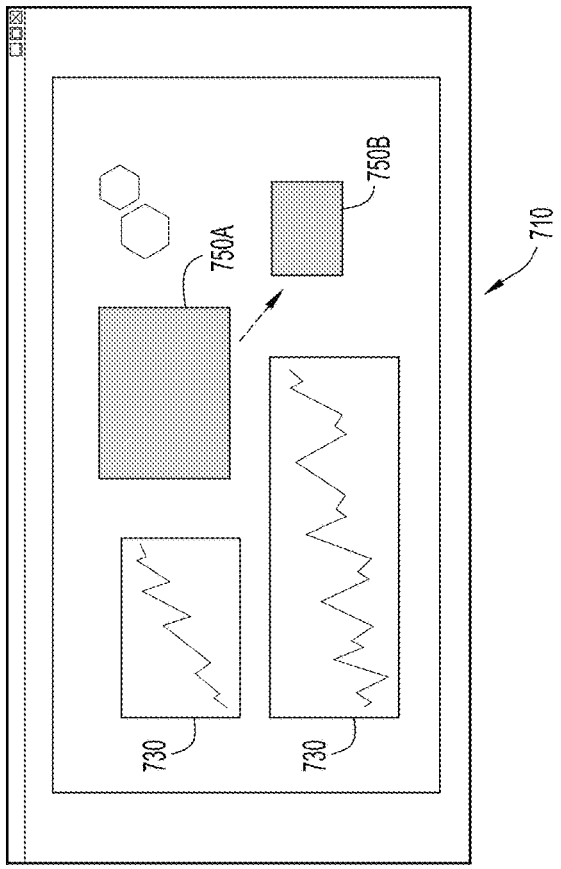

At 560, the presenter attendee, while sharing presentation content at the computing device of the meeting endpoint 20 associated with the presenter attendee, can make changes in the shape, size or dimensions and/or location of the overlay window within the shared presentation content, which in turn results in a corresponding real-time change in location, size and/or shape of the video content within the shared version of the presentation content. The presenter attendee can also choose to remove the overlay window by simply deleting it from the document or other presentation content, where this will result in the presentation window being removed from the shared content viewed by other attendees in the online meeting. In an example embodiment, the presenter attendee may decide, while sharing slide/page 710 of document 702, that the video content should be moved or changed in some manner in relation to the presentation content 730 within the slide 710. The overlay window 750 within the document can be moved or altered in size and/or shape utilizing the document software stored at and/or executed by the computing device 200 of the presenter attendee (e.g., by clicking on and dragging the overlay window 750 to another location within slide 710, enlarging or reducing the size of the overlay window 750, changing the shape of the overlay window 750, etc.). As depicted in FIG. 9C, the overlay window 750A is moved and resized (reduced in size) to overlay window 750B within the slide/page 710. At the server side, meeting server 30 (via steps 630, 640 and 650) simply maintains an identification of the overlay window within the presentation content and adjusts in real time a size and shape of the video content to correspond with the overlay window (e.g., as shown in FIG. 9D, a corresponding movement and resizing/size reduction of the presentation window 850A to presentation window 850B). Thus, when the presenter attendee (meeting endpoint side or client side) makes any change to an overlay window within content currently being presented, the meeting server adjusts the video content to correspond with fitting within the area defined by the overlay window so that these changes in location, size and/or shape of the presented video content occurs in real-time (i.e., at substantially the same time the presenter attendee makes changes to an overlay window) during the online meeting. The server also removes the video content presentation window in real time in response to the presenter attendee removing the overlay window from the presentation content during the online meeting. These features are easily enabled by facilitating creation, deletion and control of size, shape, location, etc. of the overlay window at the attendee/meeting endpoint side or client side (utilizing document or other software applications at the meeting endpoint of the attendee) while the meeting server side simply identifies the location and area defined by the overlay window within the presentation content and embeds or integrates the video content within such identified overlay window.

Figure 10B:
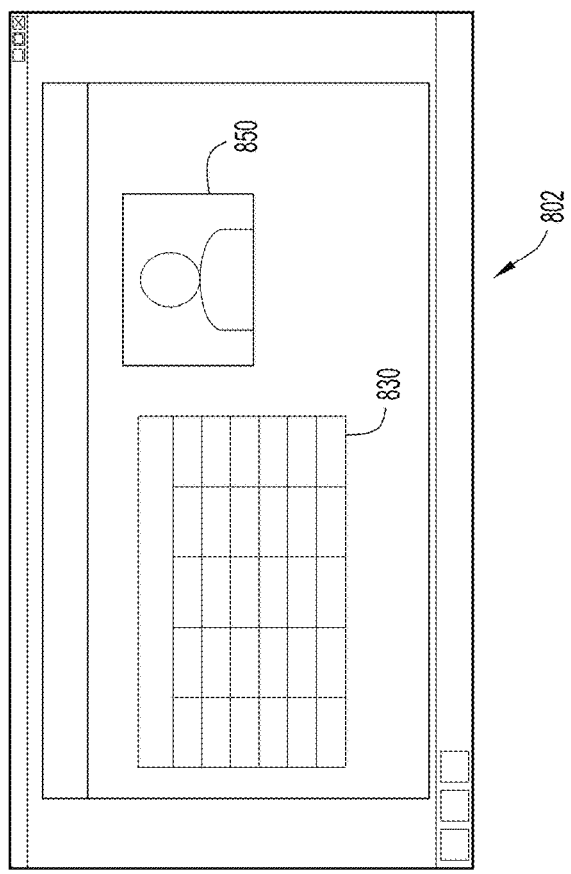
FIGS. 10A and 10B depict another example embodiment of a displayed page of a spreadsheet document, where
Figure 10A:
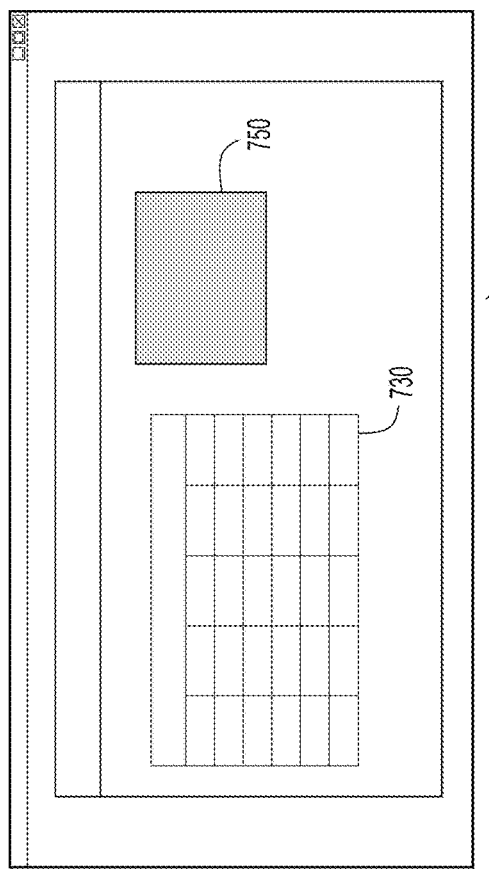

While the embodiments depicted in FIGS. 7-9 are associated with presentation content comprising slides of a slide deck document (e.g., Microsoft® POWERPOINT, or a PPT document), presentation content can also comprise other types of documents including, without limitation, word processing documents, PDF documents, and spreadsheet documents. As depicted in FIGS. 10A and 10, a spreadsheet document 702 is prepared by the presenter attendee at the computing device 200 associated with the presenter attendee (i.e., using document software stored at and/or executed by the computing device). Document 702 comprises a spreadsheet including content 730 and an overlay window 750 that includes an indicator (color) provided within the overlay window 750. The corresponding shared version of document 702 in the online meeting is depicted in FIG. 10B, where the shared document 802 includes presentation content 830 corresponding with the content 730 and also a presentation window 850 (i.e., the overlay window of the shared presentation content that includes video content embedded within the shared presentation content) having the same size, shape and location in relation to content 830 as the overlay window 750 in relation to the content 730 of the document 702.

Figure 11A:
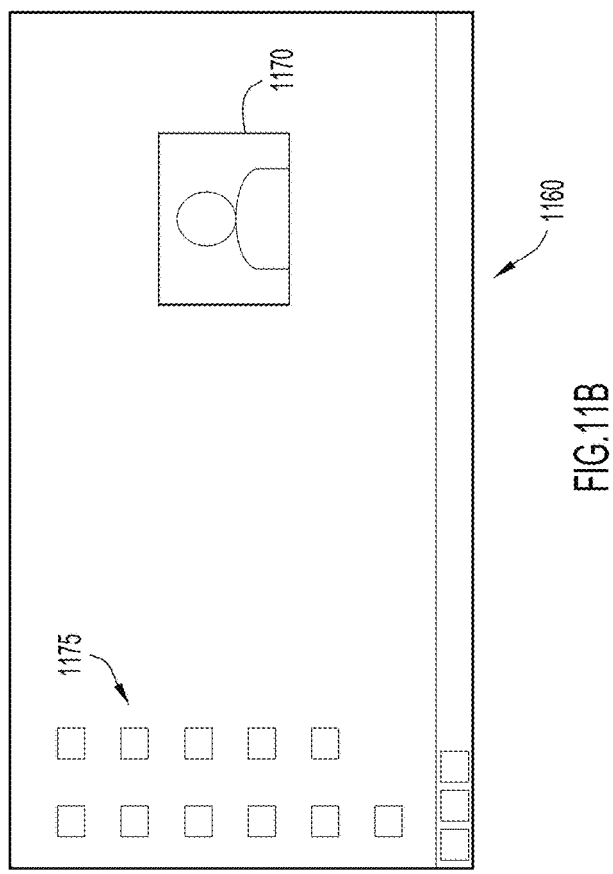
FIGS. 11A and 11B depict a further example embodiment of a desktop view from a computing device of a meeting endpoint, where
Figure 11B:
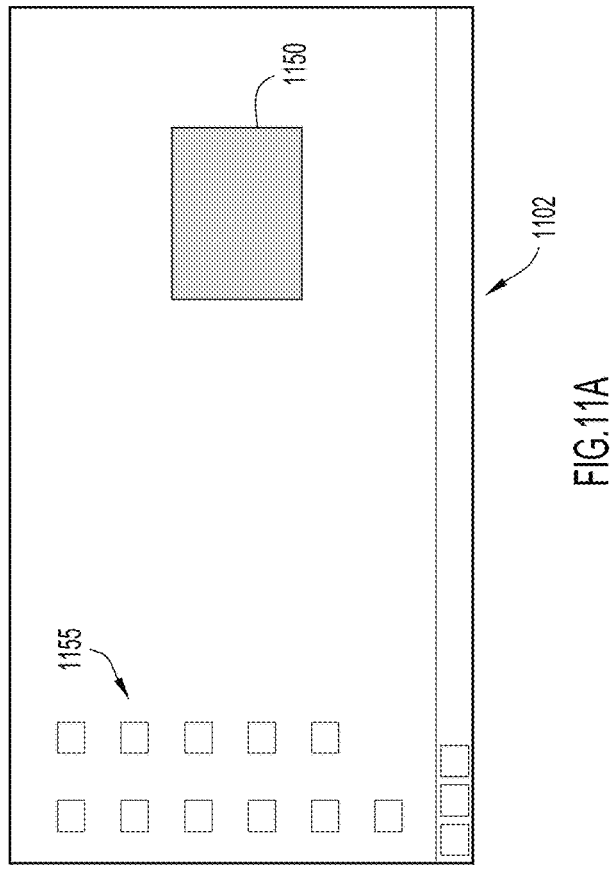

In an embodiment depicted in FIGS. 11A and 11B, the presentation content comprises the desktop view or display at the computing device of the presenter attendee (where the desktop display typically includes icons representing storage folders or applications that can be easily accessed for execution by the computing device). Referring to FIG. 11A, an overlay window 1150 including a suitable indicator provided therein (e.g., window 1150 filled with a color) is provided at the desktop display 1102 of the computing device 200 for the presenter attendee. The overlay window 1150 can be spaced from other content, such as application icons 1155 viewable on the desktop display 1102. Referring to FIG. 11B, the displayed version 1160 of the presenter attendee's desktop is depicted including presentation window 1170 and application icons 1175, where the presentation window 1170 corresponds in size, shape and location with overlay window 1150. In addition, the presentation window 1170 includes video content embedded or integrated therein.

The embodiments described herein further facilitate the presenter attendee providing a plurality of overlay windows in a single page or slide of a presentation document or in other presentation content and further designating, during the online meeting, which video streams associated with the online meeting are to be applied to the overlay windows. The meeting server(s) can also identify each overlay window in a particular page, slide or other display of presentation content and provide attendee designated video content within such identified overlay windows. Referring to the example embodiments of FIG. 12A, slide 710 of a slide deck document that is open for editing on the computing device 200 of the presenter attendee (via an application executed at the computing device) includes a first overlay window 750 and a second overlay window 752 provided at suitable locations in the slide 710 in relation to presentation content, where each overlay window includes an indicator (e.g., a color) provided within the overlay window. During the online meeting, the presenter attendee selects to share content within the browser or application user interface associated with the online meeting, and the presenter attendee can further provide the indicators to the meeting server regarding the identification of each overlay window within the presentation content. For example, a pull-down menu or other interactive tool can be provided in the browser or application user interface associated with the online meeting that allows the user to provide a first indicator for the first overlay window 750 (e.g., the color green) and a second indicator for the second overlay window 752 (e.g., the color blue).

The presenter attendee can further designate or select a specific video content stream that should be integrated and embedded within the first and second overlay windows. In an example in which the presenter attendee (e.g., Bob) may present in the online meeting along with another attendee (e.g., Alice), the presenter attendee may designate or select (e.g., via a drop-down menu allowing the presenter attendee to select a name from any of the current attendees engaged in the online meeting) the video content provided by the presenter attendee (Bob) be integrated in the first overlay window 750 while the video content provided by the other attendee (Alice) be integrated in the second overlay window 752.

Figure 12B:
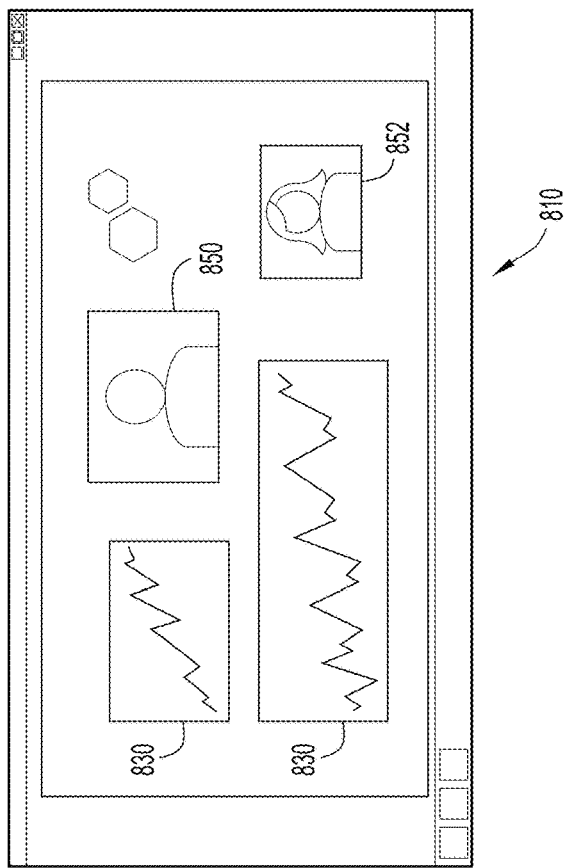
FIGS. 12A and 12B depict an example embodiment of a displayed page of a document, where
Figure 12A:
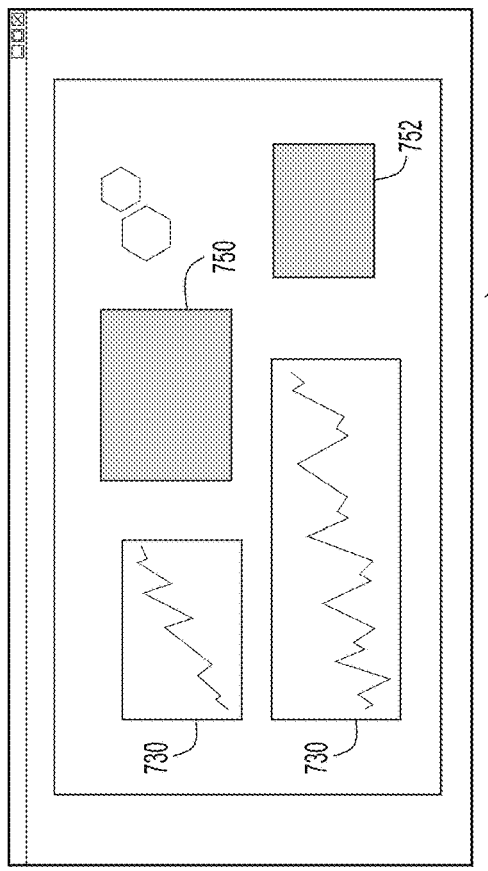

Referring to FIG. 12B, the presented or shared slide 810, which includes presentation content 830 corresponding with the presentation content 730 of slide 710, includes a first presentation window 850 and a second presentation window 852 each of which corresponds respectively with overlay windows 750, 752 in relation to size, shape and alignment/location within the area of the slide. Video content of the presenter attendee (Bob) is embedded or integrated within the first presentation window 850, while video content of the other attendee (Alice) is embedded or integrated within the second presentation window 852. This allows both attendees (Bob and Alice) to present content to other attendees in the online meeting to enhance the meeting experience and provide the attendees with easy viewing of the two presenter attendees alongside the presentation content during the online meeting (e.g., allowing visual cues provided by the presenter attendees to be easily viewed along with the current presentation content being discussed).

Thus, the embodiments described herein facilitate embedding or integrating video content within presentation content being shared by an attendee within an online meeting, where the video content can be streaming video content of at least one attendee in real-time during the online meeting. In addition, the embodiments described herein facilitate selective placement of video content (controlled at the meeting endpoint side), including having no video content integrated within presentation content (e.g., at a particular slide or page of a document), removal of video content, changing size, changing location and/or changing shape of the video content in real time during the online meeting. These features provide benefits of an enhanced meeting in which the presenter attendee can utilize visual cues (facial expressions, hand gestures, etc.) which are easily viewable by the other attendees when presentation content is being shared. Since the video content is embedded or integrated in the presentation content, attendees can easily focus on the presentation content and also watch the presenter attendee describe the content in real-time without having to otherwise switch between different views, layouts or screens within the online meeting display in order to view both the presenter attendee and the presentation content.

The origination of the video content, its precise placement, size and shape within a particular page or slide of a document is completely controlled by the attendee at the meeting endpoint side (client side), where an overlay window is generated within the presentation content by the attendee utilizing software available and executable at the meeting endpoint side. Because the presenter attendee gets to choose where to place the overlay window in each individual slide or page of a document, the presenter attendee can customize the experience by adjusting the size and position to match the content material being presented (for instance, whether the overlay window/video content appears next to, or embedded within, a chart of data, or above or below a technical schematic being displayed, etc.).

The integration of the video content within the presentation content is implemented at the meeting server side (based upon the identification of each overlay window within the presentation content provided to the meeting server). There is no additional or specialized software application required by the attendee to achieve the features of designating overlay windows within presentation content as described herein, since many software applications that provide presentation content for a meeting (e.g., word processing applications, spreadsheet applications, slide deck applications, PDF applications, etc.) already facilitate the placement of overlay windows within presentation content and further the addition of some indicator (color or an icon) within the overlay windows. In addition, at the meeting server side, control of online meeting operations which include identification of overlay windows within shared presentation content and integration of video content within such overlay windows can be easily achieved. In other words, the embodiments described herein facilitate agnostic methods for generating the overlay windows in presentation content and identification or detection and embedding/integration of video content within the presentation content, providing for a very easy mechanism for enhancing the sharing of presentation content within the online meeting.

Accordingly, in an example embodiment, a method comprises establishing, via a meeting server, an online meeting that facilitates exchange of content between a plurality of separate meeting endpoints engaged in the online meeting, wherein each meeting endpoint is associated with at least one attendee of the online meeting. Video content is received at the meeting server from one or more of the meeting endpoints, presentation content is received at the meeting server from a meeting endpoint associated with a presenter attendee that selects sharing of the presentation content within the online meeting, and an overlay window in the presentation content is identified at the meeting server. The method further comprises inserting video content received at the meeting server from at least one meeting endpoint within the overlay window in the presentation content to form presentation content integrated with video content, and providing for display to all the meeting endpoints engaged in the online meeting the presentation content integrated with video content.

The inserting video content within the overlay window can comprise entirely filling an area defined by the overlay window with the video content to form the presentation content integrated with video content.

The inserting video content within the overlay window of the presentation content can comprise inserting video content obtained from a camera of the meeting endpoint associated with the presenter attendee.

The overlay window within the presentation content can include an indicator located within the overlay window, and the identifying at the meeting server the overlay window within the presentation content comprises identification of the indicator within the overlay window. The indicator identified within the overlay window can comprise a color.

The presentation content can comprise a document including pages or slides, the document being prepared using a software application at a computing device associated with the presenter attendee, a first page or slide of the document includes a first overlay window, and a second page or slide of the document includes a second overlay window. The method can further comprise, in response to the presenter attendee selecting to share the first page or slide of the document in the online meeting, identifying at the meeting server the first overlay window in the presentation content, and inserting video content received at the meeting server from at least one meeting endpoint within the first overlay window in the presentation content to form presentation content integrated with video content, and, in response to the presenter attendee selecting to share the second page or slide of the document in the online meeting, identifying at the meeting server the second overlay window in the presentation content, and inserting video content received at the meeting server from at least one meeting endpoint within the second overlay window in the presentation content to form presentation content integrated with video content.

The first overlay window can differ from the second overlay window based upon at least one parameter selected from the group consisting of one or more dimensions of each overlay window, a shape of each overlay window, and a location of each overlay window in each page or slide.

The presentation content can include a first overlay window and a second overlay window, and the inserting of video content within the overlay window to form the presentation content integrated with video content can further comprise inserting video content obtained from a camera of the meeting endpoint associated with the presenter attendee within the first overlay window, and inserting video content obtained from a camera of another meeting endpoint associated with another attendee within the second overlay window.

In another embodiment, an apparatus can comprise a memory element configured to store instructions including one or more applications that support online meetings over a network, a network processor unit configured to enable communications over a network, and a processor. The processor can be configured to execute and control operations of the one or more applications so as to establish an online meeting that facilitates exchange of content between a plurality of separate meeting endpoints engaged in the online meeting, wherein each meeting endpoint is associated with at least one attendee of the online meeting, receive video content from one or more of the meeting endpoints, receive presentation content from a meeting endpoint associated with a presenter attendee that selects sharing of the presentation content within the online meeting, identify an overlay window in the presentation content, insert video content from at least one meeting endpoint within the overlay window in the presentation content to form presentation content integrated with video content, and provide for display to all the meeting endpoints engaged in the online meeting the presentation content integrated with video content.

The processor can further be configured to execute and control operations of the one or more applications so as to insert video content within the overlay window by entirely filling an area defined by the overlay window with the video content to form the presentation content integrated with video content.

The processor can further be configured to execute and control operations of the one or more applications so as to insert within the overlay window video content obtained from a camera of the meeting endpoint associated with the presenter attendee.

The overlay window within the presentation content can include an indicator located within the overlay window, and the processor can further be configured to execute and control operations of the one or more applications so as to identify the overlay window within the presentation content by further identifying the indicator within the overlay window. The indicator within the overlay window can comprise a color.

The presentation content can comprise a document including pages or slides, the document being prepared using a software application at a computing device associated with the presenter attendee, a first page or slide of the document includes a first overlay window, and a second page or slide of the document includes a second overlay window. The processor can further be configured to execute and control operations of the one or more applications so as to identify the first overlay window in the presentation content in response to the presenter attendee selecting to share the first page or slide of the document in the online meeting, and insert video content within the first overlay window in the presentation content to form presentation content integrated with video content, and identify the second overlay window in the presentation content in response to the presenter attendee selecting to share the second page or slide of the document in the online meeting, and insert video content within the second overlay window in the presentation content to form presentation content integrated with video content.

The presentation content can include a first overlay window and a second overlay window, and the processor can further be configured to execute and control operations of the one or more applications so as to insert video content obtained from a camera of the meeting endpoint associated with the presenter attendee within the first overlay window, and insert video content obtained from a camera of another meeting endpoint associated with another attendee within the second overlay window.

In a further example embodiment, one or more computer readable storage media can be encoded with software comprising computer executable instructions and when the software is executed operable to establish an online meeting that facilitates exchange of content between a plurality of separate meeting endpoints engaged in the online meeting, wherein each meeting endpoint is associated with at least one attendee of the online meeting, receive video content at a meeting server from one or more of the meeting endpoints, receive presentation content at the meeting server from a meeting endpoint associated with a presenter attendee that selects sharing of the presentation content within the online meeting, identify at the meeting server an overlay window in the presentation content, insert video content received at the meeting server from at least one meeting endpoint within the overlay window in the presentation content to form presentation content integrated with video content, and provide for display to all the meeting endpoints engaged in the online meeting the presentation content integrated with video content.

The inserting video content within the overlay window can comprise entirely filling an area defined by the overlay window with the video content to form the presentation content integrated with video content.

The inserting video content within the overlay window of the presentation content can comprise inserting video content obtained from a camera of the meeting endpoint associated with the presenter attendee.

The overlay window within the presentation content can include an indicator located within the overlay window, and the identifying at the meeting server the overlay window within the presentation content can comprise identification of the indicator within the overlay window.

The presentation content can comprise a document including pages or slides, the document being prepared using a software application at a computing device associated with the presenter attendee, a first page or slide of the document includes a first overlay window, and a second page or slide of the document includes a second overlay window. The instructions can further be operable to, in response to the presenter attendee selecting to share the first page or slide of the document in the online meeting, identify at the meeting server the first overlay window in the presentation content, and insert video content received at the meeting server from at least one meeting endpoint within the first overlay window in the presentation content to form presentation content integrated with video content, and, in response to the presenter attendee selecting to share the second page or slide of the document in the online meeting, identify at the meeting server the second overlay window in the presentation content, and insert video content received at the meeting server from at least one meeting endpoint within the second overlay window in the presentation content to form presentation content integrated with video content.

In the embodiments described herein, any number of any conventional or other databases, data stores or storage structures (e.g., files, databases, data structures, data or other repositories, etc.) can be implemented to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, software application, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
  establishing, via a meeting server, an online meeting that facilitates exchange of content between a plurality of separate meeting endpoints engaged in the online meeting, wherein each meeting endpoint is associated with at least one attendee of the online meeting;
  receiving video content at the meeting server from one or more of the meeting endpoints;
  receiving presentation content at the meeting server from a meeting endpoint associated with a presenter attendee that selects sharing of the presentation content within the online meeting;
  identifying at the meeting server an overlay window in the presentation content, wherein the overlay window is within the presentation content provided by the meeting endpoint associated with the presenter attendee, the overlay window within the presentation content includes an indicator located within the overlay window such that the identifying at the meeting server the overlay window within the presentation content comprises identification of the indicator within the overlay window, and the overlay window is selectively movable within the presentation content by the meeting endpoint during the online meeting while still being identified at the meeting server;
  inserting video content received at the meeting server from at least one meeting endpoint within the overlay window in the presentation content to form presentation content integrated with video content; and providing for display to all the meeting endpoints engaged in the online meeting the presentation content integrated with video content.

2. The method of claim 1, wherein the inserting video content within the overlay window comprises entirely filling an area defined by the overlay window with the video content to form the presentation content integrated with video content.

3. The method of claim 1, wherein the inserting video content within the overlay window of the presentation content comprises inserting video content obtained from a camera of the meeting endpoint associated with the presenter attendee.

4. The method of claim 1, wherein the indicator identified within the overlay window comprises a color, a symbol or an icon.

5. The method of claim 4, wherein a specific type of color, symbol or icon is selected by the presenter attendee as the indicator within the overlay window of the presentation content.

6. The method of claim 1, wherein the presentation content comprises a document including pages or slides, the document being prepared using a software application at a computing device associated with the presenter attendee, a first page or slide of the document includes a first overlay window, and a second page or slide of the document includes a second overlay window, and the method further comprises:
  in response to the presenter attendee selecting to share the first page or slide of the document in the online meeting, identifying at the meeting server the first overlay window in the presentation content, and inserting video content received at the meeting server from at least one meeting endpoint within the first overlay window in the presentation content to form presentation content integrated with video content; and
  in response to the presenter attendee selecting to share the second page or slide of the document in the online meeting, identifying at the meeting server the second overlay window in the presentation content, and inserting video content received at the meeting server from at least one meeting endpoint within the second overlay window in the presentation content to form presentation content integrated with video content.

7. The method of claim 6, wherein the first overlay window differs from the second overlay window based upon at least one parameter selected from the group consisting of one or more dimensions of each overlay window, a shape of each overlay window, and a location of each overlay window in each page or slide.

8. The method of claim 1, wherein the presentation content includes a first overlay window and a second overlay window, and the inserting video content within the overlay window to form the presentation content integrated with video content further comprises:
  inserting video content obtained from a camera of the meeting endpoint associated with the presenter attendee within the first overlay window; and
  inserting video content obtained from a camera of another meeting endpoint associated with another attendee within the second overlay window.

9. An apparatus comprising:
  a memory element configured to store instructions including one or more applications that support online meetings over a network;
  a network processor unit configured to enable communications over a network; and
  a processor configured to execute and control operations of the one or more applications so as to:
    establish an online meeting that facilitates exchange of content between a plurality of separate meeting endpoints engaged in the online meeting, wherein each meeting endpoint is associated with at least one attendee of the online meeting;
    receive video content from one or more of the meeting endpoints;
    receive presentation content from a meeting endpoint associated with a presenter attendee that selects sharing of the presentation content within the online meeting;
    identify an overlay window in the presentation content, wherein the overlay window is within the presentation content provided by the meeting endpoint associated with the presenter attendee, the overlay window within the presentation content includes an indicator located within the overlay window such that the identifying at the meeting server the overlay window within the presentation content comprises identification of the indicator within the overlay window, and the overlay window is selectively movable within the presentation content by the meeting endpoint during the online meeting while still being identified at the meeting server;
    insert video content from at least one meeting endpoint within the overlay window in the presentation content to form presentation content integrated with video content; and
    provide for display to all the meeting endpoints engaged in the online meeting the presentation content integrated with video content.

10. The apparatus of claim 9, wherein the processor is further configured to execute and control operations of the one or more applications so as to insert video content within the overlay window by entirely filling an area defined by the overlay window with the video content to form the presentation content integrated with video content.

11. The apparatus of claim 9, wherein the processor is further configured to execute and control operations of the one or more applications so as to insert within the overlay window, video content obtained from a camera of the meeting endpoint associated with the presenter attendee.

12. The apparatus of claim 9, wherein the indicator within the overlay window comprises a color, a symbol or an icon.

13. The apparatus of claim 12, wherein a specific type of color, symbol or icon is selected by the presenter attendee as the indicator within the overlay window of the presentation content.

14. The apparatus of claim 9, wherein the presentation content comprises a document including pages or slides, the document being prepared using a software application at a computing device associated with the presenter attendee, a first page or slide of the document includes a first overlay window, and a second page or slide of the document includes a second overlay window, and the processor is further configured to execute and control operations of the one or more applications so as to:
  identify the first overlay window in the presentation content in response to the presenter attendee selecting to share the first page or slide of the document in the online meeting, and insert video content within the first overlay window in the presentation content to form presentation content integrated with video content; and
  identify the second overlay window in the presentation content in response to the presenter attendee selecting to share the second page or slide of the document in the online meeting, and insert video content within the second overlay window in the presentation content to form presentation content integrated with video content.

15. The apparatus of claim 9, wherein the presentation content includes a first overlay window and a second overlay window, and the processor is further configured to execute and control operations of the one or more applications so as to:
  insert video content obtained from a camera of the meeting endpoint associated with the presenter attendee within the first overlay window; and
  insert video content obtained from a camera of another meeting endpoint associated with another attendee within the second overlay window.

16. One or more non-transitory computer readable storage media encoded with software comprising computer executable instructions and when the software is executed operable to:
  establish an online meeting that facilitates exchange of content between a plurality of separate meeting endpoints engaged in the online meeting, wherein each meeting endpoint is associated with at least one attendee of the online meeting;
  receive video content at a meeting server from one or more of the meeting endpoints;
  receive presentation content at the meeting server from a meeting endpoint associated with a presenter attendee that selects sharing of the presentation content within the online meeting;
  identify at the meeting server an overlay window in the presentation content, wherein the overlay window is within the presentation content provided by the meeting endpoint associated with the presenter attendee, the overlay window within the presentation content includes an indicator located within the overlay window such that the identifying at the meeting server the overlay window within the presentation content comprises identification of the indicator within the overlay window, and the overlay window is selectively movable within the presentation content by the meeting endpoint during the online meeting while still being identified at the meeting server;
  insert video content received at the meeting server from at least one meeting endpoint within the overlay window in the presentation content to form presentation content integrated with video content; and
  provide for display to all the meeting endpoints engaged in the online meeting the presentation content integrated with video content.

17. The computer readable storage media of claim 16, wherein the inserting video content within the overlay window comprises entirely filling an area defined by the overlay window with the video content to form the presentation content integrated with video content.

18. The computer readable storage media of claim 16, wherein the inserting video content within the overlay window of the presentation content comprises inserting video content obtained from a camera of the meeting endpoint associated with the presenter attendee.

19. The computer readable storage media of claim 16, wherein the indicator within the overlay window comprises a color, a symbol or an icon.

20. The computer readable storage media of claim 16, wherein the presentation content comprises a document including pages or slides, the document being prepared using a software application at a computing device associated with the presenter attendee, a first page or slide of the document includes a first overlay window, and a second page or slide of the document includes a second overlay window, the instructions are further operable to:
  in response to the presenter attendee selecting to share the first page or slide of the document in the online meeting, identify at the meeting server the first overlay window in the presentation content, and insert video content received at the meeting server from at least one meeting endpoint within the first overlay window in the presentation content to form presentation content integrated with video content; and
  in response to the presenter attendee selecting to share the second page or slide of the document in the online meeting, identify at the meeting server the second overlay window in the presentation content, and insert video content received at the meeting server from at least one meeting endpoint within the second overlay window in the presentation content to form presentation content integrated with video content.

* * * * *